US011960365B2

(12) United States Patent
Zhang et al.

(10) Patent No.: US 11,960,365 B2
(45) Date of Patent: *Apr. 16, 2024

(54) AUTOMATED BACKUP AND RESTORE OF A DISK GROUP

(71) Applicant: Google LLC, Mountain View, CA (US)

(72) Inventors: Xiangdong Zhang, Wellesley, MA (US); Satya Sri Kanth Palaparthi, Waltham, MA (US); Sachindra Kumar, Framingham, MA (US); Uday Tekade, Westford, MA (US); Madhav Mutalik, Southborough, MA (US); Suresh Bezawada, Hyderabad (IN)

(73) Assignee: Google LLC, Mountain View, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/452,569

(22) Filed: Oct. 27, 2021

(65) Prior Publication Data

US 2022/0114059 A1 Apr. 14, 2022

Related U.S. Application Data

(63) Continuation of application No. 16/004,022, filed on Jun. 8, 2018, now Pat. No. 11,176,001.

(51) Int. Cl.
*G06F 11/14* (2006.01)
(52) U.S. Cl.
CPC ...... *G06F 11/1466* (2013.01); *G06F 11/1469* (2013.01); *G06F 2201/84* (2013.01)
(58) Field of Classification Search
None
See application file for complete search history.

(56) References Cited

U.S. PATENT DOCUMENTS

| | | |
|---|---|---|
| 4,626,829 A | 12/1986 | Hauck |
| 5,381,545 A | 1/1995 | Baker et al. |
| 5,410,667 A | 4/1995 | Belsan et al. |
| 5,497,483 A | 3/1996 | Beardsley et al. |
| 5,535,381 A | 7/1996 | Kopper |
| 5,819,292 A | 10/1998 | Hitz et al. |
| 5,828,876 A | 10/1998 | Fish et al. |

(Continued)

OTHER PUBLICATIONS

Leins et al. "Tivoli Storage Manager Version 3.7.3 & 4.1: Technical Guide" ® International Business Machines Corporation 368 pages (Sep. 2000).

(Continued)

*Primary Examiner* — Eddy Cheung
(74) *Attorney, Agent, or Firm* — Honigman LLP; Brett A. Krueger

(57) ABSTRACT

Restoring a clustered database having a plurality of nodes each having database from a failed storage device by receiving a request to restore a backup image of a failed shared storage device associated with the clustered database to a time; performing a preflight check including at least one checklist process; terminating the restore when any checklist process fails; when each checklist process succeeds completing the restore by creating at least one flashcopy associated with the backup image, mapping to each of the plurality of nodes an associated portion of the at least one flashcopy, mounting the at least one flashcopy to the node as a diskgroup, and switching the clustered database to run from the diskgroup.

20 Claims, 21 Drawing Sheets

(56) References Cited

U.S. PATENT DOCUMENTS

| | | | |
|---|---|---|---|
| 5,857,208 A | 1/1999 | Ofek | |
| 5,963,962 A | 10/1999 | Hitz et al. | |
| 6,065,018 A | 5/2000 | Beier et al. | |
| 6,081,875 A | 6/2000 | Clifton et al. | |
| 6,119,208 A | 9/2000 | White et al. | |
| 6,131,148 A | 10/2000 | West et al. | |
| 6,148,412 A | 11/2000 | Cannon et al. | |
| 6,163,856 A | 12/2000 | Dion et al. | |
| 6,192,444 B1 | 2/2001 | White et al. | |
| 6,199,146 B1 | 3/2001 | Pence | |
| 6,202,071 B1 | 3/2001 | Keene | |
| 6,212,531 B1 | 4/2001 | Blea et al. | |
| 6,226,759 B1 | 5/2001 | Miller et al. | |
| 6,269,381 B1 | 7/2001 | St. Pierre et al. | |
| 6,269,431 B1 | 7/2001 | Dunham | |
| 6,324,548 B1 | 11/2001 | Sorenson | |
| 6,330,614 B1 | 12/2001 | Aggarwal et al. | |
| 6,434,681 B1 | 8/2002 | Armangau | |
| 6,460,055 B1 | 10/2002 | Midgley et al. | |
| 6,487,561 B1 | 11/2002 | Ofek et al. | |
| 6,557,089 B1 | 4/2003 | Reed et al. | |
| 6,625,704 B2 | 9/2003 | Winokur | |
| 6,654,772 B1 | 11/2003 | Crow et al. | |
| 6,654,912 B1 | 11/2003 | Viswanathan et al. | |
| 6,665,815 B1 | 12/2003 | Goldstein et al. | |
| 6,668,264 B1 | 12/2003 | Patterson et al. | |
| 6,708,227 B1 | 3/2004 | Cabrera et al. | |
| 6,772,302 B1 | 8/2004 | Thompson | |
| 6,779,094 B2 | 8/2004 | Selkirk et al. | |
| 6,823,336 B1 | 11/2004 | Srinivasan et al. | |
| 6,823,436 B2 | 11/2004 | Krishnamurthy | |
| 6,850,929 B2 | 2/2005 | Chang et al. | |
| 6,898,688 B2 | 5/2005 | Martin et al. | |
| 6,915,397 B2 | 7/2005 | Lubbers et al. | |
| 6,928,526 B1 | 8/2005 | Zhu et al. | |
| 6,948,039 B2 | 9/2005 | Biessener et al. | |
| 6,957,362 B2 | 10/2005 | Armangau | |
| 7,072,916 B1 | 7/2006 | Lewis et al. | |
| 7,143,251 B1 | 11/2006 | Patterson | |
| 7,222,194 B2 | 5/2007 | Kano et al. | |
| 7,325,111 B1 | 1/2008 | Jiang | |
| 7,346,623 B2 | 3/2008 | Prahlad et al. | |
| 7,386,695 B2 | 6/2008 | Fuente | |
| 7,389,300 B1 | 6/2008 | Shah et al. | |
| 7,428,657 B2 | 9/2008 | Yamasaki | |
| 7,647,355 B2 | 1/2010 | Best et al. | |
| 7,689,633 B1 | 3/2010 | Li et al. | |
| 7,707,184 B1 | 4/2010 | Zhang et al. | |
| 7,814,128 B2 | 10/2010 | Silvers et al. | |
| 7,937,547 B2 | 5/2011 | Liu et al. | |
| 8,037,032 B2 | 10/2011 | Pershin et al. | |
| 8,150,808 B2 | 4/2012 | Zha et al. | |
| 8,180,740 B1 | 5/2012 | Stager et al. | |
| 8,180,742 B2 | 5/2012 | Claudatos et al. | |
| 8,299,944 B2 | 10/2012 | Provenzano | |
| 8,401,997 B1 * | 3/2013 | Tawri | G06F 11/2071 707/655 |
| 8,407,191 B1 | 3/2013 | Nanda | |
| 8,706,833 B1 | 4/2014 | Bergant et al. | |
| 8,788,769 B2 | 7/2014 | Abercrombie et al. | |
| 9,098,432 B1 | 8/2015 | Bachu et al. | |
| 9,613,046 B1 * | 4/2017 | Xu | H04L 67/1095 |
| 2002/0129214 A1 | 9/2002 | Sarkar | |
| 2003/0101321 A1 | 5/2003 | Ohran | |
| 2003/0140070 A1 | 7/2003 | Kaczmarski et al. | |
| 2004/0172577 A1 | 9/2004 | Tan et al. | |
| 2004/0199570 A1 | 10/2004 | Terao | |
| 2005/0066095 A1 | 3/2005 | Mullick et al. | |
| 2005/0165794 A1 | 7/2005 | Mosescu | |
| 2005/0187992 A1 | 8/2005 | Prahlad et al. | |
| 2006/0047712 A1 | 3/2006 | Shitomi et al. | |
| 2006/0074945 A1 | 4/2006 | Mori | |
| 2006/0190243 A1 | 8/2006 | Barkai et al. | |
| 2009/0222496 A1 | 9/2009 | Liu et al. | |
| 2009/0307285 A1 | 12/2009 | Gipp et al. | |
| 2011/0047405 A1 | 2/2011 | Marowsky-Bree et al. | |
| 2011/0184915 A1 | 7/2011 | Wu et al. | |
| 2011/0258161 A1 | 10/2011 | Constantinescu et al. | |
| 2013/0339302 A1 | 12/2013 | Zhang et al. | |
| 2014/0052693 A1 | 2/2014 | Zha et al. | |
| 2014/0068040 A1 | 3/2014 | Neti et al. | |
| 2015/0143064 A1 | 5/2015 | Bhargava et al. | |
| 2015/0212893 A1 | 7/2015 | Pawar et al. | |
| 2016/0203054 A1 | 7/2016 | Zhang et al. | |
| 2016/0283335 A1 | 9/2016 | Yao et al. | |
| 2017/0068595 A1 | 3/2017 | Nautiyal et al. | |
| 2017/0109246 A1 | 4/2017 | Chien et al. | |
| 2017/0315877 A1 | 11/2017 | Kaplingat et al. | |
| 2017/0371750 A1 | 12/2017 | Horowitz et al. | |
| 2019/0281558 A1 | 9/2019 | Wu et al. | |

OTHER PUBLICATIONS

Linett and Ranade "The Real Problems of Backup" Fourth NASA Goddard Conference on Mass Storage Systems and Technologies NASA Conference Publication 3295 13 pages (Mar. 28-30, 1995).

Merrill et al. "SnapVault Best Practices Guide" NetApp Technical Report 29 pages (2008).

Mesnier et al. "Object-Based Storage" IEEE Communications Magazine vol. 41 No. 8 pp. 84-90 (Aug. 2003).

Mesnier et al. "Object-Based Storage" IEEE Potentials pp. 31-34 (Apr.May 2005).

Milligan et al. "Simplifying Management of Complex Business Operations (A Study of Mainline Storaae Virtualization)" CMG 2001 Proceedings vol. 2 13 oaaes (Dec. 2-7, 2001).

Mortimer et al. "ADSM Version 3 Technical Guide" ® International Business Machines Corporation 384 pages (Dec. 1998).

Mortimer et al. "Using ADSM to Back Up Databases" ® International Business Machines Corporation Part 618 pages (Jul. 1998).

Mullender and Tanenbaum "Immediate Files" Software—Practice and Experience vol. 14 No. 4 pp. 365-368 (Apr. 1984).

Muller and Pasquale "A High Performance Multi-Structured File System Design" SOSP '91 Proceedings of the Thirteenth ACM Symposium on Operating Systems Principles pp. 56-67 (1991).

Mushran "OCFS2: A Cluster File System for Linux: User's Guide for Release 1.4" 44 pages (Jul. 2008).

NetApp Inc. "Data ONTAP® 7.3 System Administration Guide" 349 pages (Nov. 2010).

Network Appliance Inc. "Data ONTAP 10.0: Architecture Basic Concepts Guide" 18 pages (Nov. 2006).

Network Appliance Inc. "Data ONTAP™M 6.3 Command Reference" 452 pages (Aug. 2002).

Network Appliance Inc. "Network Appliance™ SnapMirror® Software" 2 pages (2006).

Network Appliance Inc. "SnapManager® 2.1 for Oracle® Installation and Administration Guide" 272 pages (Apr. 2007).

Osuna et al. "Data Protection Strategies in IBM System Storage N Series" Redbooks ©; International Business Machines Corporation 90 oaaes (Jun. 2008).

Osuna et al. "IBM System Storage N Series SnapMirror" Redbooks © International Business Machines Corporation 124 pages (Jul. 2006).

Pate et al. "Implementing Snapshot" Redbooks © International Business Machines Corporation 214 pages (Jul. 1999).

Pate et al. "RAMAC Virtual Array Peer-to-Peer Remote Copy and IXFPSnapShot for VSEESA" Redbooks © International Business Machines Corporation 84 pages (Jan. 1999).

Pate et al. "RAMAC Virtual Array: Implementing Peer-to-Peer Remote Copy" Redbooks ©; International Business Machines Corporation 140 pages (Dec. 1998).

Patterson et al. "SnapMirror®: File System Based Asynchronous Mirroring for Disaster Recovery" Usenix Association Proceedings of the FAST 2002 Conference on File and Storage Technologies 14 pages (Jan. 28-30, 2002).

Petition for Inter Parts Review of U.S. Pat. No. 8,299,944 Under 35 U.S.C. §§ 311-319 and 37 C.F.R. 42.1-.80 42.100-.123 Aug. 6, 2015 (43 pages).

(56) References Cited

OTHER PUBLICATIONS

Petition for Inter Parts Review of U.S. Pat. No. 8,788,769 Under 35 U.S.C. §§ 311-319 and 37 C.F.R. §§ 42.1-.80 42.100-.123 Aug. 7, 2015 (71 pages).
Phillips "Zumastor Linux Storage Server" Proceedings of the Linux Symposium vol. 2 Ottawa Ontario Canada 14 pages (Jun. 27-30, 2007).
Prahlad et al. "Method for Managing Snapshots Generated by an Operating System or Other Application" Provisional U.S. Appl. No. 60/326,021, filed Sep. 28, 2001, 16 pages.
Quinlan and Dorward "Venti: A New Approach to Archival Storage" Usenix Association Proceedings of the FAST 2002 Conference on File and Storage Technologies 14 pages (Jan. 28-30, 2002).
Sadagopan et al. "Oracle Fusion Middleware DR Solution Using NetApp Storage" NetApp Technical Report 38 pages (May 2008).
Sarkar "Instant Image: Transitive and Cyclical Snapshots in Distributed Storage Volumes" Euro-Par 2000 DD. 1284-1291 (2000).
Schuettinger and Litton "Helping DBAs Become More Efficient: NetApp Efficiency and Manageability Advantages" NetApp White Paper 12 pages (Jul. 2009).
Solter et al. "OpenSolaris™ Bible" Wiley Publishing Inc. Indianapolis Indiana 9 pages (2009).
Sweeney "xFS In-core Inode Management" 10 pages (Nov. 29, 1993).
Syncsort Incorporated "Syncsort Backup Express Advanced Recovery for NetApp" 12 pages; (2008).
Tate et al. "Implementing the IBM System Storage SAN Volume Controller V4.3" 970 pages (Oct. 2008).
Thekkath et al. "Frangipani: A Scalable Distributed File System" Proceeding SOSP '97 Proceedings of the Sixteenth ACM Symposium on Operating Systems Principles 25 pages (1997).
Tretau et al. "IBM TotalStorage NAS Backup and Recovery Solutions" Redbooks © International Business Machines Corporation 226 pages (Jul. 2002).
Veritas Software Corporation "Veritas NetBackup 4.5 Business Server™: Getting Started Guide"; © VERITAS Software Corporation 91 pages (Mar. 2002).
Vmware Inc. "Vmware Consolidated Backup: Best Practices and Deployment Considerations for SAN Environments" 39 pages (2007).
Wolf "VM Backup Bliss? The State of VM Data Protection in the Enterprise" © Burton Group 45 pages, (Aug. 1, 2007).
You et al. "Deep Store: An Archival Storage System Architecture" Proceedings of the 21st International Conference on Data Engineering (ICDE 2005) 12 pages (2005).
Zhang and Ghose "yFS: A Journaling File System Design for Handling Large Data Sets with Reduced Seeking" Proceedings of FAST '03: 2nd USENIX Conference on File and Storage Technologies 15 pages (Mar. 31-Apr. 2, 2003).
Zhu et al. "Avoiding the Disk Bottleneck in the Data Domain Deduplication File System" Proceedings of the 6th USENIX Conference on File and Storage Technologies (FAST '08) 14 pages (2008).
Exhibit A-17 to Delphix Corp.'s Preliminary Invalidity and Non-Infringement Contentions "The Episode File System ("Episode") as Prior Art to U.S. Pat. No. 6,732,244" 21 pages (Jul. 3, 2015).
Exhibit A-18 to Delphix Corp.'s Preliminary Invalidity and Non-Infringement Contentions "Informix Storage Manager and Database Servers ("Informix") as Prior Art to U.S. Pat. No. 6,732,244" 34 pages (Jul. 3, 2015).
Exhibit A-19 to Delphix Corp.'s Preliminary Invalidity and Non-Infringement Contentions "U.S. Pat. No. 6,779,094 ("the '094 patent") as Prior Art to U.S. Pat. No. 6,732,244" 44 pages (Jul. 3, 2015).
Exhibit A-20 to Delphix Corp.'s Preliminary Invalidity and Non-Infringement Contentions "EMC NetWorkerLegato NetWorker ("NetWorker") as Prior Art to U.S. Pat. No. 6,732,244" 59 pages (Jul. 3, 2015).
Exhibit A-21 to Delphix Corp.'s Preliminary Invalidity and Non-Infringement Contentions "EMC TimeFinder as Prior Art to U.S. Pat. No. 6,732,244" 51 pages (Jul. 3, 2015).
Exhibit A-22 to Delphix Corp.'s Preliminary Invalidity and Non-Infringement Contentions "Retrospect as Prior Art to U.S. Pat. No. 6,732,244" 12 pages (Jul. 3, 2015).
Exhibit A-23 to Delphix Corp.'s Preliminary Invalidity and Non-Infringement Contentions "U.S. Pat. No. 6,119,208 to White et al. ("White") as Prior Art to U.S. Pat. No. 6,732,244" (25 pages).
Exhibit B-01 to Delphix Corp.'s Preliminary Invalidity and Non-Infringement Contentions "Data Domain ("Data Domain") as Prior Art to U.S. Pat. No. 6,959,369" 10 pages (Jul. 3, 2015).
Exhibit B-02 to Delphix Corp.'s Preliminary Invalidity and Non-Infringement Contentions "Hitachi ShadowImage ("ShadowImage") as Prior Art to U.S. Pat. No. 6,959,369" 10 pages (Jul. 3, 2015).
Exhibit B-03 to Delphix Corp.'s Preliminary Invalidity and Non-Infringement Contentions "U.S. Pat. No. 6,269,431 as Prior Art to U.S. Pat. No. 6,959,369" 42 pages (Jul. 3, 2015).
Exhibit B-04 to Delphix Corp.'s Preliminary Invalidity and Non-Infringement Contentions "Green Designing a Fast On-line Backup System for a Log-structured File System as Prior Art to U.S. Pat. No. 6,959,369" 104 pages (Jul. 3, 2015).
Exhibit B-05 to Delphix Corp.'s Preliminary Invalidity and Non-Infringement Contentions "U.S. Pat. No. 5,535,381 as Prior Art to U.S. Pat. No. 6,959,369" 84 pages (Jul. 3, 2015).
Exhibit B-06 to Delphix Corp.'s Preliminary Invalidity and Non-Infringement Contentions "Hutchinson as Claim Chart for U.S. Pat. No. 6,959,369" 80 pages (Jul. 3, 2015).
Exhibit B-07 to Delphix Corp.'s Preliminary Invalidity and Non-Infringement Contentions "U.S. Patent Application No. 20030140070 ("the '070 application") as Prior Art to U.S. Pat. No. 6,959,369" 67 pages (Jul. 3, 2015).
Exhibit B-08 to Delphix Corp.'s Preliminary Invalidity and Non-Infringement Contentions "U.S. Pat. No. 6,898,688 as Prior Art to U.S. Pat. No. 6,959,369" 53 pages (Jul. 3, 2015).
Exhibit B-09 to Delphix Corp.'s Preliminary Invalidity and Non-Infringement Contentions "U.S. Pat. No. 6,434,681 as Prior Art to U.S. Pat. No. 6,959,369" 44 pages (Jul. 3, 2015).
Exhibit B-10 to Delphix Corp.'s Preliminary Invalidity and Non-Infringement Contentions "U.S. Pat. No. 7,072,916 ("the '916 patent") as Prior Art to U.S. Pat. No. 6,959,369" 59 pages (Jul. 3, 2015).
Exhibit B-11 to Delphix Corp.'s Preliminary Invalidity and Non-Infringement Contentions "Chervenak as Prior Art to U.S. Pat. No. 6,959,369" 69 pages (Jul. 3, 2015).
Exhibit B-12 to Delphix Corp.'s Preliminary Invalidity and Non-Infringement Contentions "IBM Adstar Distributed Storage Manager ("ADSM") Tivoli Storage Manager as Prior Art to U.S. Pat. No. 6,959,369" 54 pages (Jul. 3, 2015).
Exhibit B-13 to Delphix Corp.'s Preliminary Invalidity and Non-Infringement Contentions "Petal: Distributed Virtual Disks (Lee) as Prior Art to U.S. Pat. No. 6,959,369" 51 pages (Jul. 3, 2015).
Exhibit B-14 to Delphix Corp.'s Preliminary Invalidity and Non-Infringement Contentions "U.S. Pat. No. 6,915,397 ("the '397 patent") as Prior Art to U.S. Pat. No. 6,959,369" 94 pages (Jul. 3, 2015).
Exhibit B-15 to Delphix Corp.'s Preliminary Invalidity and Non-Infringement Contentions "IBM Ramac Virtual Array ("RAMAC" or "RVA") as Prior Art to U.S. Pat. No. 6,959,369" 89 pages (Jul. 3, 2015).
Exhibit B-16 to Delphix Corp.'s Preliminary Invalidity and Non-Infringement Contentions "Symantec NetBackupNeritas NetBackup ("NetBackup") as Prior Art to U.S. Pat. No. 6,959,369" 65 pages (Jul. 3, 2015).
Exhibit B-17 to Delphix Corp.'s Preliminary Invalidity and Non-Infringement Contentions "EMC NetWorkerLegato NetWorker ("NetWorker") as Prior Art to U.S. Pat. No. 6,959,369" 92 pages (Jul. 3, 2015).
Exhibit B-20 to Delphix Corp.'s Preliminary Invalidity and Non-Infringement Contentions "Informix Storage Manager and Database Servers ("Informix") as Prior Art to U.S. Pat. No. 6,959,369" 70 pages (Jul. 3, 2015).

(56) References Cited

OTHER PUBLICATIONS

Exhibit B-21 to Delphix Corp.'s Preliminary Invalidity and Non-Infringement Contentions "NetApp Data Protection Solution ("NetApp") as Prior Art to U.S. Pat. No. 6,959,369" 58 pages (Jul. 3, 2015).
Exhibit B-22 to Delphix Corp.'s Preliminary Invalidity and Non-Infringement Contentions "U.S. Pat. No. 6,119,208 to White et al. ("White") as Prior Art to U.S. Pat. No. 6,959,369" 43 pages (Jul. 3, 2015).
Galli "Journal File Systems in Linux" Upgrade vol. 2 No. 6 8 pages (Dec. 2001).
Garrett and Palmer "Syncsort Backup Express and NetApp: Advanced Data Protection and Disaster Recovery" The Enterprise Strategy Group Lab Validation Report 19 pages (Jan. 2009).
Gordon "High Noon-Backup and Recovery: What Works What Doesn't and Why" Enterprise Systems Journal vol. 15 No. 9 5 pages (Sep. 2000).
Gu et al. "DB2 Udb Backup and Recovery with ESS Copy Services" Redbooks © International Business Machines Corporation 144 paoes (Auoust 2002).
Hendricks et al. "Improving Small File Performance in Object-Based Storage" Parallel Data Laboratory Carnegie Mellon University Pittsburgh Pennsylvania 21 pages (May 2006).
Herrin II and Finkel "The Viva File System" University of Kentucky Department of Computer Science Technical Report No. 225-93 26 pages (1997).
Heyt et al. "Tivoli Storage Manager Version 3.7: Technical Guide" Redbooks © International Business Machines Corporation 248 pages (Dec. 1999).
Hitz et al. "File System Design for an NFS File Server Appliance" © Network Appliance Corporation Technical Report 3002 23 pages (Jan. 19, 1994).
Holton et al. "XFS: A Next Generation Journalled 64-Bit Filesystem with Guaranteed Rate 10" 15 paoes (Jun. 5, 1997).
Hutchinson et al. "Logical vs. Physical File System Backup" Usenix Association Proceedings of the 3rd Symposium on Operating Systems Design and Implementation 12 pages (Feb. 1999).
Innovation Data Processing "FDR InstantBackup™. . . Innovation Instant Solutions" 2 pages.
Isilon Systems "Backup and Recovery with Isilon IQ Clustered Storage" 19 pages (Aug. 2007).
Keeton and Merchant "A Framework for Evaluating Storage System Dependability" Proceedings of the 2004 International Conference on Dependable Systems and Networks (DSN'04) 10 pages (2004).
Kim et al. "Volume Management in SAN Environment" Proceedings of the Eighth International Conference on Parallel and Distributed Systems pp. 500-505 (2001).
Klivansky "A Thorough Introduction to FlexClone™ Volumes" NetApp Technical White Paper 35 pages (Oct. 2004).
Klosterman "Delayed Instantiation Bulk Operations for Management of Distributed Object-Based Storage Systems" Thesis for partial completion of degree for Doctor of Philosophy Carnegie Mellon University Department of Electrical and Computer Engineering 255 pages (Aug. 2009).
Kulkarni et al. "Redundancy Elimination Within Large Collections of Files" Proceedings of the General Track: 2004 USENIX Annual Technical Conference 15 pages (2004).
Kara "Ext4 btrfs and the others" Linux-Kongress The International Linux System Technology Conference 15 pages (Oct. 30, 2009).
Lee and Thekkath "Petal: Distributed Virtual Disks" ASPLOS VII: Proceedings of the Seventh International Conference on Architectural Support for Programming Languages and Operating Systems DD. 84-92 (1996).
Lee et al. "A Comparison of Two Distributed Disk Systems" Systems Research Center Research Report 25 pages (Apr. 30, 1998).
Legato "Legato NetWorker" Administrator's Guide Release 6.1 UNIX Version 638 pages (2001).
"Backup of Oracle in EMC Symmetrix Environments with EMC NetWorker PowerSnap" EMC Corporation Whie Paper 25 pages (Aug. 2008).
"CommVault® Simpana® Quick Recovery® Software for Critical Data Center Applications and File Systems"® CommVault Systems Inc. 35 pages (2010).
"IBM RAMAC Virtual Array" Redbooks© International Business Machines Corporation 490 pages (Jul. 1997).
"Informix Backup and Restore Guide" © Informix Corporation 280 pages (Dec. 1999).
"Informix Storage Manager: Administrator's Guide" © Informix Corporation 166 pages (Dec. 1999).
"Near-Instant Oracle Cloning with Syncsort AdvancedClient Technologies" Syncsort Incorporated White Paper 12 pages (2007).
"Network Appliance Adds SnapRestore SnapMirror to OnTap" Computergram International 2 pages (Apr. 26, 1999).
"Setting Up and Implementing ADSTAR Distributed Storage Manager400" © International Business Machines Corporation 350 pages (Mar. 1995).
"StorTrendsManageTrends® (Version 2.7) User's Guide for the StorTends 1300 Storage Appliance" © American Megatrends Inc. 378 pages (Mar. 23, 2009).
"Symantec Backup Exec Quick Recovery & Off-Host Backup Solutions for Microsoft Exchange Server 2003 & Microsoft SQL Server" Symantec Corporation White Paper, 9 pages (2005).
"Veritas File System 4.1 Administrator's Guide" © Hewlett-Packard Development Company L.P. 270 pages (May 200.
"Veritas FlashSnap Point-in-Time Copy Solutions" Administrator's Guide 4.1 © Veritas Software Corporation 102 pages (Apr. 2006).
"Veritas NetBackup™ 4.5 for Informix: System Administrator's Guide" © Veritas Software Corporation 94 pages (Mar. 2002).
"Veritas NetBackup ™ 4.5: User's Guide" © Veritas Software Corporation 212 pages (Mar. 2002).
Chang et al. "Performance analysis of two frozen image based backup restore methods" 2005 IEEE International Conference on Electron Information Technology 7 pages (Mav 22-25 2005).
Chapman et al. "SnapMirror® Best Practices Guide" Network Appliance Inc. 63 pages (Apr. 2006).
Chervenak et al. "Protecting File Systems: A Survey of Backup Techniques" Sixth Goddard Conference on Mass Storage Systems and Technologies in cooperation with Fifteenth IEEE Symposium on Mass Storage Systems 17 pages (Mar. 1998).
Chutani et al. "The Episode File System" Proceedings of the Winter 1992 USENIX Conference 19 pages (Jan. 20-24, 1992).
Dantz Development Corporation "Retrospect® User's Guide" 2002 (262 pages).
"EMC Celerra Version 5.6 Technical Primer: SLA-Driven Replication with Celerra Replicator (V2): Technology Concepts and Business Considerations" EMC Corporation White Paper 20 pages (Jul. 2008).
"EMC DL1500 and DL3000 with EMC NetWorker: Best Practices Planning" EMC Corporation White Paper 36 pages (Jul. 2009).
EMC Corporation "EMC TimeFinder Product Description Guide" 34 pages (1998).
EMC Corporation "Next-Generation Backup-to-Disk: Building the Foundation for Effective Operational Recovery Management" 9 pages (Jan. 31, 2005).
"Unified Backup and Recovery with EMC NetWorker" EMC Corporation White Paper 16 pages (Mar. 2010).
Exhibit 1004 IPR2015-01689 Declaration of Ellie Young 24 pages (Aug. 5, 2015).
Exhibit 1006 IPR2015-01678 Pfaffenberger Webster's New World Computer Dictionary Ninth Edition Hungry Minds Inc. New York New York 4 pages (2001).
Exhibit 1006 IPR2015-01689 File History for U.S. Appl. No. 12/947,393, Apr. 14, 2015 (108 pages).
Exhibit 1006v2 IPR2015-01689 Version 2 File History for U.S. Appl. No. 12/947,393, filed Nov. 16, 2010 (177 pages).
Exhibit 1006v3 IPR2015-01689 Version 3 File History for U.S. Appl. No. 12/947,393, filed Nov. 16, 2010 (150 pages).
Exhibit 1006v4 IPR2015-01689 Version 4 File History for U.S. Appl. No. 12/947,393, filed Nov. 16, 2010 (98 pages).
Exhibit 1007 IPR2015-01678 Microsoft Computer Dictionary Fourth Edition Microsoft Press Redmond Washinoton 3 pages (1999).

(56) References Cited

OTHER PUBLICATIONS

Exhibit 1007 IPR2015-01689 Declaration of Prashant Shenoy Ph.D. in Support of Petition for Inter Partes Review 82 pages (Aug. 5, 2015).
Exhibit 1008 IPR2015-01678 File History for U.S. Appl. No. 12/947,438, filed Nov. 16, 2010 (100 pages).
Exhibit 1008v2 IPR2015-01678 Version 2 File History for U.S. Appl. No. 12/947,438, filed Nov. 16, 2010 (103 pages).
Exhibit 1009 IPR2015-01678 Declaration of Prashant Shenoy Ph.D. in Support of Petition for Inter Partes Review 58 pages (Aug. 5, 2015).
Exhibit A-03 to Delphix Corp.'s Preliminary Invalidity and Non-Infringement Contentions "Hitachi ShadowImage ("ShadowImage") as Prior Art to U.S. Pat. No. 6,732,244" 7 pages (Jul. 3, 2015).
Exhibit A-05 to Delphix Corp.'s Preliminary Invalidity and Non-Infringement Contentions "U.S. Pat. No. 6,915,397 ("the '397 patent") as Prior Art to U.S. Pat. No. 6,732,244" 44 pages (Jul. 3, 2015).
Exhibit A-07 to Delphix Corp.'s Preliminary Invalidity and Non-Infringement Contentions "Petal: Distributed Virtual Disks (Lee) as Prior Art to U.S. Pat. No. 6,732,244" 35 pages (Jul. 3, 2015).
Exhibit A-08 to Delphix Corp.'s Preliminary Invalidity and Non-Infringement Contentions "EMC TimeFinder as Prior Art to U.S. Pat. No. 6,732,244" 51 pages (Jul. 3, 2015).
Exhibit A-09 to Delphix Corp.'s Preliminary Invalidity and Non-Infringement Contentions "U.S. Pat. No. 6,434,681 as Prior Art to U.S. Pat. No. 6,732,244" 19 pages (Jul. 3, 2015).
Exhibit A-10 to Delphix Corp.'s Preliminary Invalidity and Non-Infringement Contentions "U.S. Pat. No. 7,072,916 ("the '916 patent") as Prior Art to U.S. Pat. No. 6,732,244" 65 pages (Jul. 3, 2015).
Exhibit A-12 to Delphix Corp.'s Preliminary Invalidity and Non-Infringement Contentions "Chervenak as Prior Art to U.S. Pat. No. 6,732,244" 21 pages (Jul. 3, 2015).
Exhibit A-13 to Delphix Corp.'s Preliminary Invalidity and Non-Infringement Contentions "IBM ADSTAR Distributed Storage Manager ("ADSM")Tivoli Storage Manager as Prior Art to U.S. Pat. No. 6,732,244" 52 pages (Jul. 3, 2015).
Exhibit A-14 to Delphix Corp.'s Preliminary Invalidity and Non-Infringement Contentions "Green Designing a Fast On-line Backup System for a Log-structured File System as Prior Art to U.S. Pat. No. 6,732,244" 80 pages (Jul. 3, 2015).
Exhibit A-15 to Delphix Corp.'s Preliminary Invalidity and Non-Infringement Contentions "U.S. Pat. No. 5,535,381 as Prior Art to U.S. Pat. No. 6,732,244" 53 pages (Jul. 3, 2015).
Exhibit A-16 to Delphix Corp.'s Preliminary Invalidity and Non-Infringement Contentions "IBM RAMAC Virtual Array ("RAMAC" or "RVA") as Prior Art to U.S. Pat. No. 6,732,244" 68 pages (Jul. 3, 2015).

\* cited by examiner

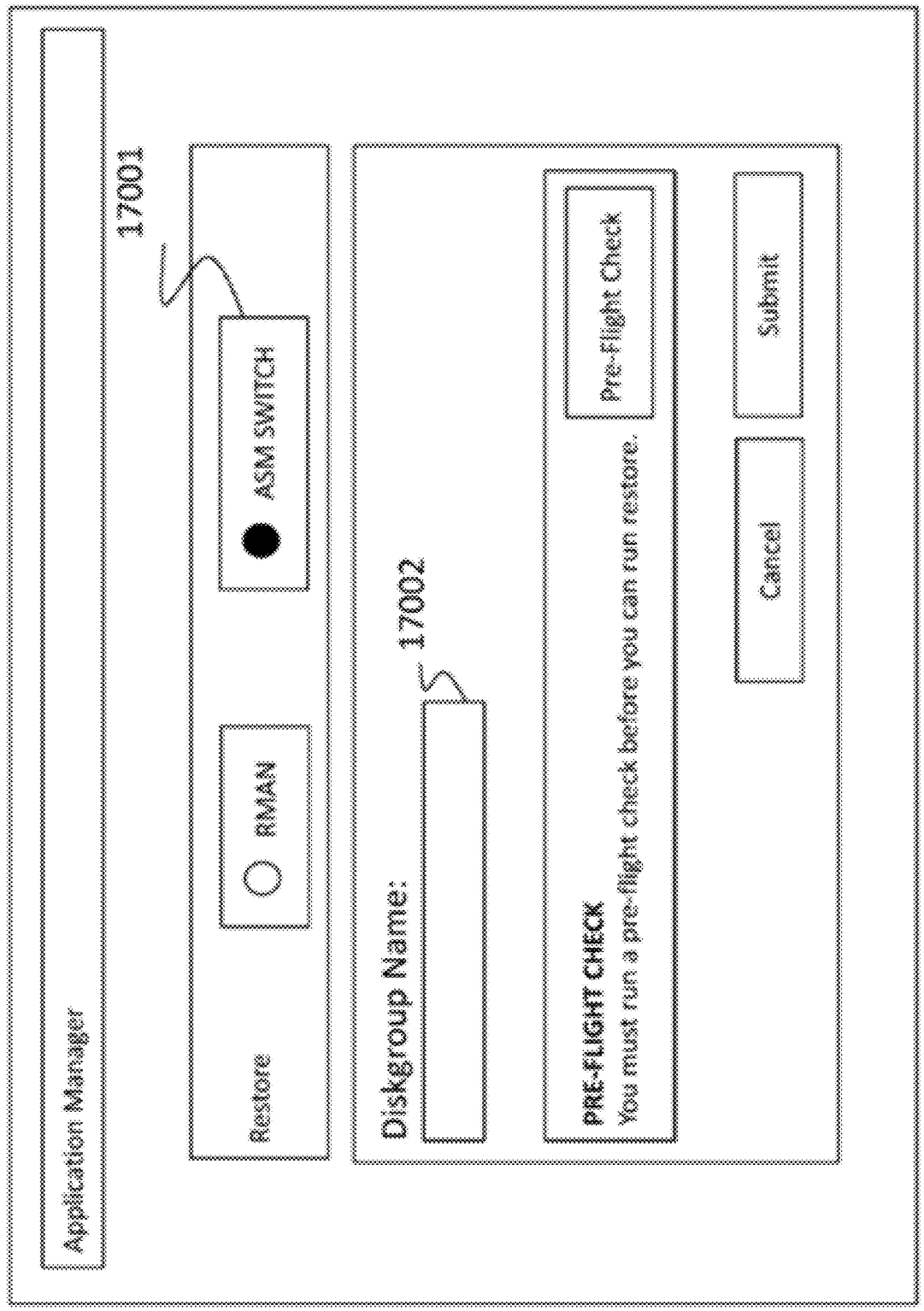
FIG. 17: ASM Switch GUI Interface

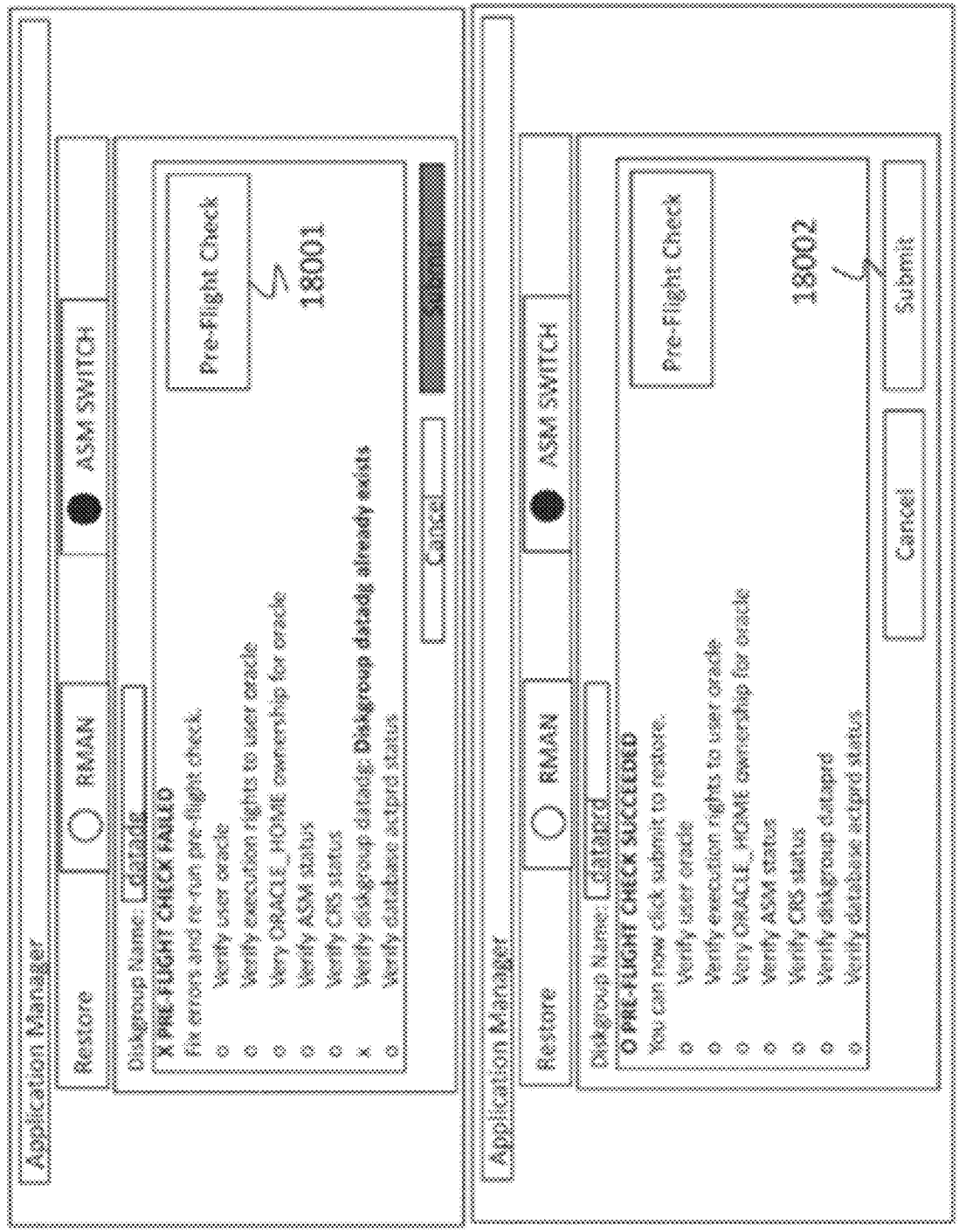
FIG. 18: Preflight Check for ASM Switch

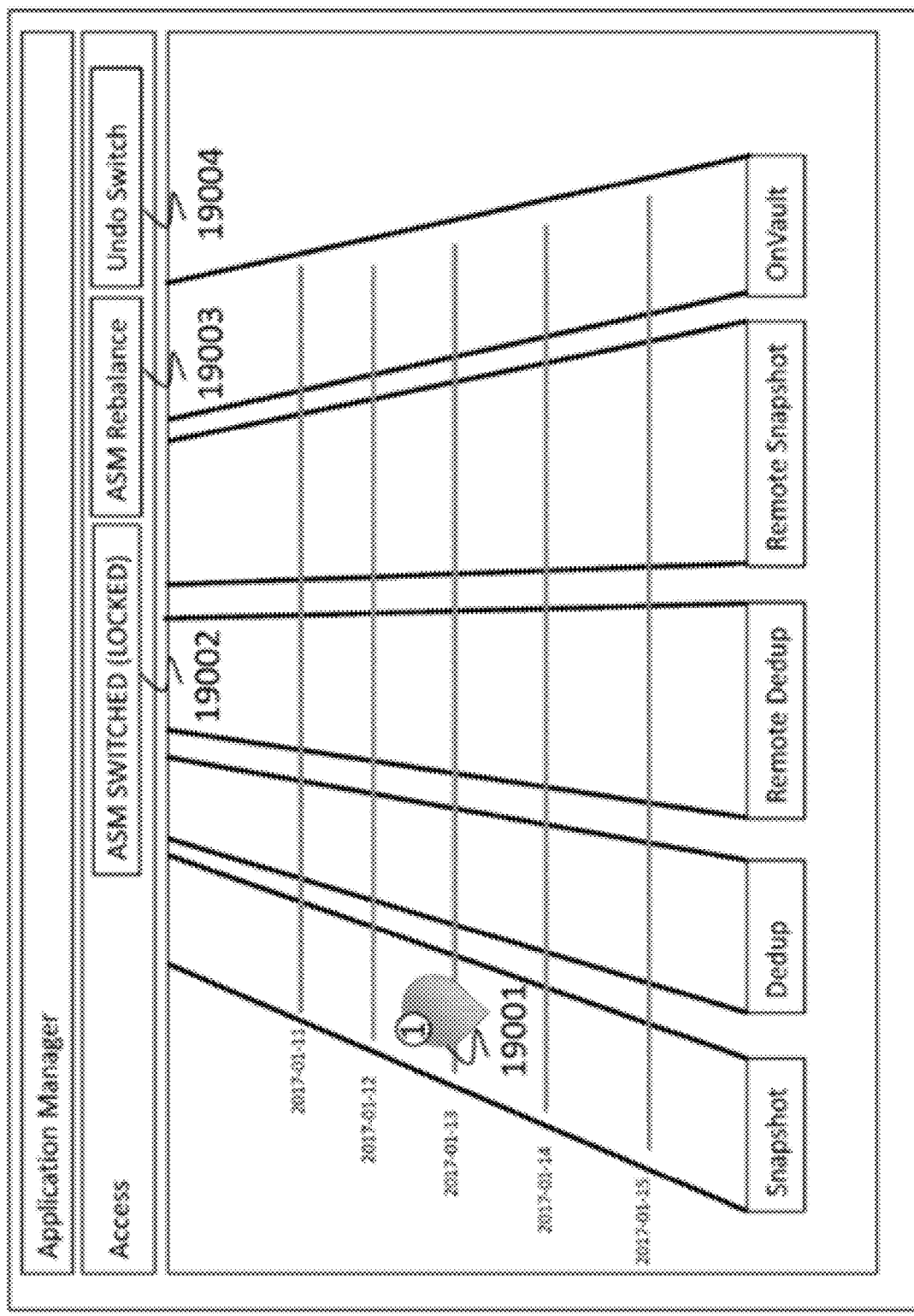
FIG. 19: After Restore Using Switch

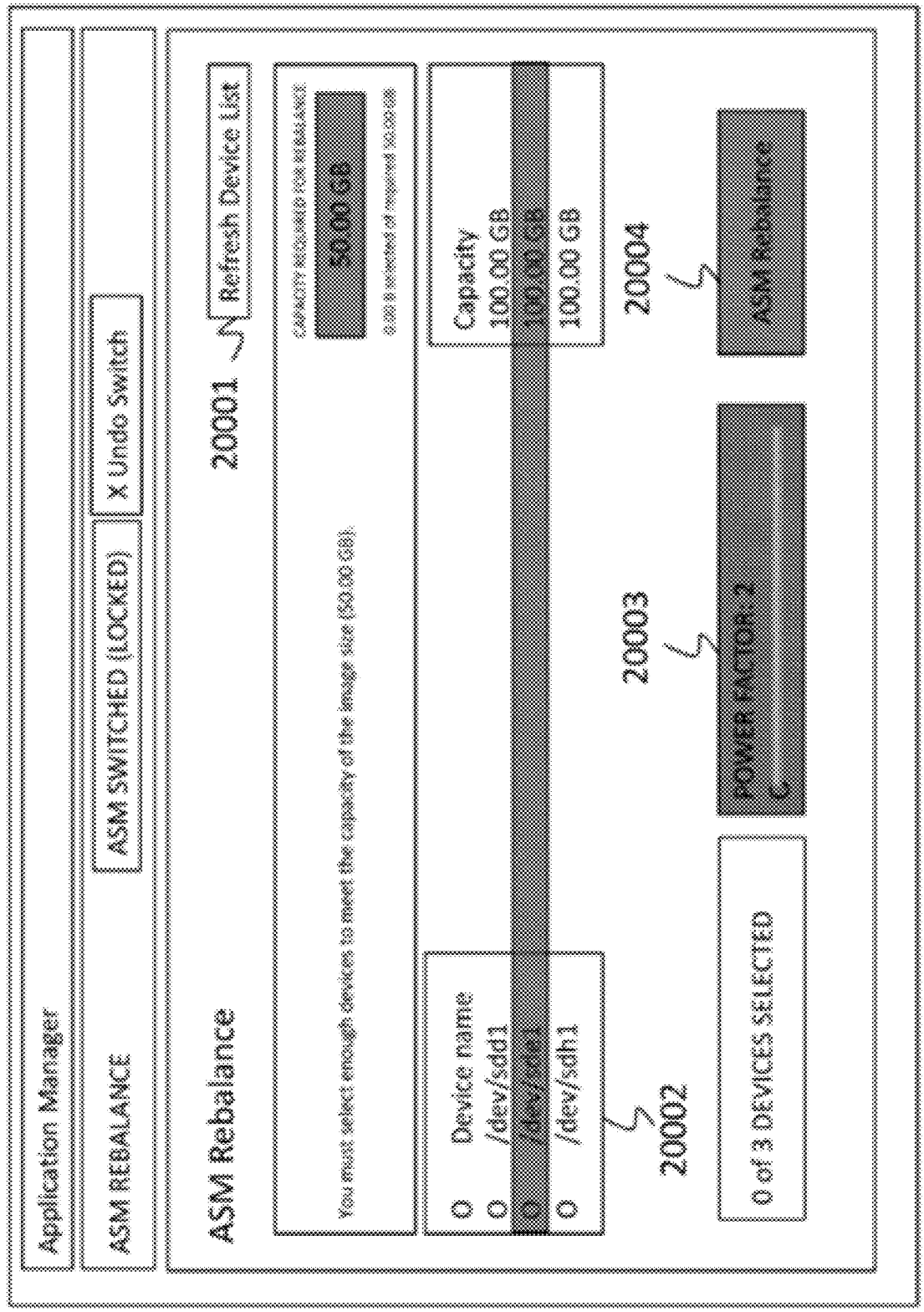
FIG. 20: Rebalance Device List Retrieval

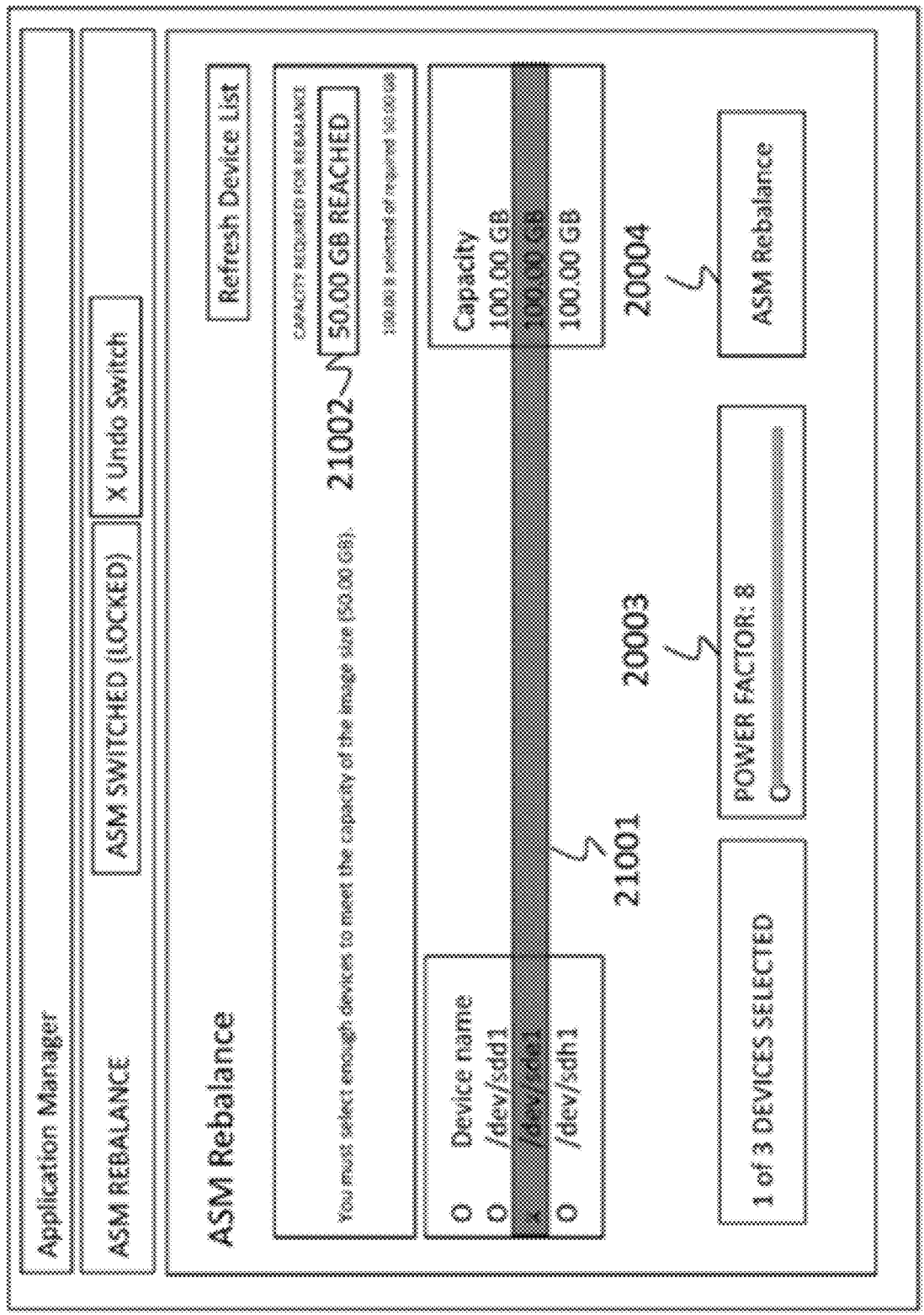
FIG. 21: Rebalance Device Selection and Capacity Validation

AUTOMATED BACKUP AND RESTORE OF A DISK GROUP

CROSS REFERENCE TO RELATED APPLICATIONS

This U.S. patent application is a continuation of, and claims priority under 35 U.S.C. § 120 from, U.S. patent application Ser. No. 16/004,022, filed on Jun. 8, 2018. The disclosure of this prior art application is considered part of the disclosure of this application and is hereby incorporated by reference in its entirety.

TECHNICAL FIELD

This disclosure relates generally to copy data management techniques, and specifically to disk group based backup of databases.

BACKGROUND

Some traditional copy data services provide instant data availability for restore and read write access in certain situations. This instant data availability is realized by mount of filesystem-based backup to a database host. Although traditional protection methods enable instant data accessibility in certain situations, traditional methods are often inadequate, e.g., for the following scenarios: (1) an instant restore of a Very Large Database (VLDB) when a production database goes offline and when a database (e.g., an Oracle database) is protected Out-of-Band (OOB); and (2) provisioning of a clustered database (e.g., Oracle Real Application Clusters (RAC)) in a test and development environment for instant data availability using a production backup of the clustered database.

SUMMARY

In accordance with the disclosed subject matter, systems, methods, and non-transitory computer-readable media are provided for restoring a clustered database with near zero downtime.

The disclosed subject matter includes a computerized method of restoring a clustered database with near zero downtime. A first computing device receives a request to restore a backup image of a failed shared storage device to a specified time. The failed shared storage device is associated with the clustered database, and the clustered database has a plurality of nodes, each of which have database data from the failed shared storage device. The first computing device performs a preflight check on nodes of the clustered database. The preflight check includes performing at least one checklist process, including validating a user associated with the request to restore the clustered database, checking a location of software associated with performing the requested restore, checking whether requisite software is running, and checking whether the clustered database is running. Each performed checklist process is associated with a pass status, indicating that the performed checklist process passed, and a fail status which indicates that the performed checklist process failed. When a performed checklist process is associated with a fail status, the first computing device terminates the restore. When each performed checklist process is associated with a pass status, the restore is completed by the first computing device creating at least one flashcopy associated with the backup image, the first computing device mapping to each of the plurality of nodes an associated portion of the at least one flashcopy, each node mounting the at least one flashcopy to the node as a diskgroup, and the plurality of nodes switching the clustered database to run from the diskgroup, thereby restoring clustered databases with near zero downtime.

The disclosed subject matter includes a computing system for restoring a clustered database with near zero downtime. The computing system includes a processor a memory coupled to the processor. The memory includes computer-readable instructions that, when executed by the processor, cause the processor to receive, at a first computing device, a request to restore a backup image of a failed shared storage device to a specified time. The failed shared storage device is associated with the clustered database, and the clustered database has a plurality of nodes, each of which have database data from the failed shared storage device. The memory includes computer-readable instructions that, when executed by the processor, cause the processor to perform, by a first computing device, a preflight check on nodes of the clustered database. The preflight check includes performing at least one checklist process, including validating a user associated with the request to restore the clustered database, checking a location of software associated with performing the requested restore, checking whether requisite software is running, and checking whether the clustered database is running. Each performed checklist process is associated with a pass status, indicating that the performed checklist process passed, and a fail status which indicates that the performed checklist process failed. The memory includes computer-readable instructions that, when executed by the processor, cause the processor to terminate the restore when a performed checklist is associated with a fail status, the first computing device. The memory includes computer-readable instructions that, when executed by the processor, cause the processor to complete the restore when each performed checklist process is associated with a pass status, completing the restore includes the first computing device creating at least one flashcopy associated with the backup image, the first computing device mapping to each of the plurality of nodes an associated portion of the at least one flashcopy, each node mounting the at least one flashcopy to the node as a diskgroup, and the plurality of nodes switching the clustered database to run from the diskgroup, thereby restoring clustered databases with near zero downtime.

The disclosed subject matter includes a non-transitory computer readable medium for restoring a clustered database with near zero downtime and having executable instructions operable to cause an apparatus to receive, at a first computing device, a request to restore a backup image of a failed shared storage device to a specified time. The failed shared storage device is associated with the clustered database, and the clustered database has a plurality of nodes, each of which have database data from the failed shared storage device. The non-transitory computer readable medium having executable instructions operable to cause an apparatus to perform, by a first computing device, a preflight check on nodes of the clustered database. The preflight check includes performing at least one checklist process, including validating a user associated with the request to restore the clustered database, checking a location of software associated with performing the requested restore, checking whether requisite software is running, and checking whether the clustered database is running. Each performed checklist process is associated with a pass status, indicating that the performed checklist process passed, and a fail status which indicates that the performed checklist process failed. The non-transitory computer readable medium having executable instructions operable to cause an apparatus to terminate the restore when a performed checklist is associated with a fail status, the first computing device. The non-transitory computer readable medium having executable instructions operable to cause an apparatus to complete the restore when each performed checklist process is associated with a pass status, completing the restore includes the first computing device creating at least one flashcopy associated with the backup image, the first computing device mapping to each of the plurality of nodes an associated portion of the at least one flashcopy, each node mounting the at least one flashcopy to the node as a diskgroup, and the plurality of nodes switching the clustered database to run from the diskgroup, thereby restoring clustered databases with near zero downtime.

In some embodiments, terminating the restore includes providing a preflight check failure message. In some embodiments completing the restore includes restoring the shared storage database data to a shared storage device. In some embodiments restoring the shared storage data includes the first computing device receiving a selection of an instance of data running on the diskgroup, the first computing device querying at least one of the plurality of nodes to determine an availability status of each of at least one disk of the shared storage device, the availability status indicating whether the disk is a candidate disk, a former candidate disk, or a provisioned disk, the first computing device receiving the availability status for each of the at least one disk of the shared storage device, and if a disk is a candidate disk the availability status further includes a capacity of the candidate disk, the first computing device receiving a selection of at least one candidate disk of the shared storage device to be used in rebalance, the first computing device verifying the at least one candidate disk to be used in rebalance, the first computing device receiving a power factor associated with a speed of data movement during rebalance, and the nodes migrating the diskgroup data to shared storage using rebalancing after the shared storage is repaired, and rebalancing includes spreading diskgroup data evenly across each of the at least one candidate disk based at least in part on the received instance selection, the received disk selection, and the received power factor. In some embodiments validating a user to be used in the restore includes at least one of determining an identity of the user, determining execution rights associated with the user, and determining at least one of a permission status and an ownership status associated with the user. In some embodiments checking whether requisite software is running includes checking whether at least one of Oracle Cluster Ready Services and an Automatic Storage Management instance is running. In some embodiments checking whether the clustered database is running includes running a process of the clustered database. In some embodiments completing the restore further includes, when the specified time is different than a time associated with the backup image, applying, by the plurality of nodes, an archivelog to the flashcopy on the diskgroup such that the database is recovered to the specified time, the archivelog associated with changes to the database data since the time associated with the backup image.

These and other capabilities of the disclosed subject matter will be more fully understood after a review of the following figures, detailed description, and claims. It is to be understood that the phraseology and terminology employed herein are for the purpose of description and should not be regarded as limiting.

DESCRIPTION OF DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 17 is a screenshot showing an ASM switch interface, according to some embodiments of the present disclosure.

FIG. 18 is a screenshot showing a preflight check for ASM switch, according to some embodiments of the present disclosure.

FIG. 19 is a screenshot showing a restored database after ASM switch, according to some embodiments of the present disclosure.

FIG. 20 is a screenshot showing an ASM rebalance, according to some embodiments of the present disclosure.

FIG. 21 is a screenshot showing a rebalance device selection and capacity validation, according to some embodiments of the present disclosure.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

In some examples, database OOB protection can be performed in a CDS using a native filesystem regardless of whether the source database is running from a filesystem or a disk group (also referred to herein as ASM diskgroup). When restoring an OOB protected instance, the CDS mounts a backup image, followed by RMAN (Recovery Manager) performing a catalog and restore. For a VLDB, restoring the whole database can take a long time, as RMAN physically moves data from a backup image to production storage. An alternative that can be used to minimize the downtime can be achieved by using a mount of a backup image from CDS, and followed by a clone process to standup a database. This methodology can bring an instance up quickly, but running in degraded mode, e.g. if source database is a RAC running from ASM, the cloned instance can only run as standalone instance, and from a filesystem (as backup image copies are stored on a filesystem). Traditionally, a backup destination is either filesystem or tape. Cloning of a source database also presents similar challenges in an RAC environment where test and development is also required to run the exact same deployment configuration as source.

In some embodiments, systems and methods described herein use an ASM diskgroup as a backup staging disk format, the CDS uses RMAN to backup database as image copy to the CDS staging disk; upon the completion of the backup, the CDS takes a snapshot of the staging disk to create a point in time copy of the backup. With an ASM diskgroup based backup, the CDS can restore a production database by using an RMAN switch to a managed database backup copy.

Figure 1:
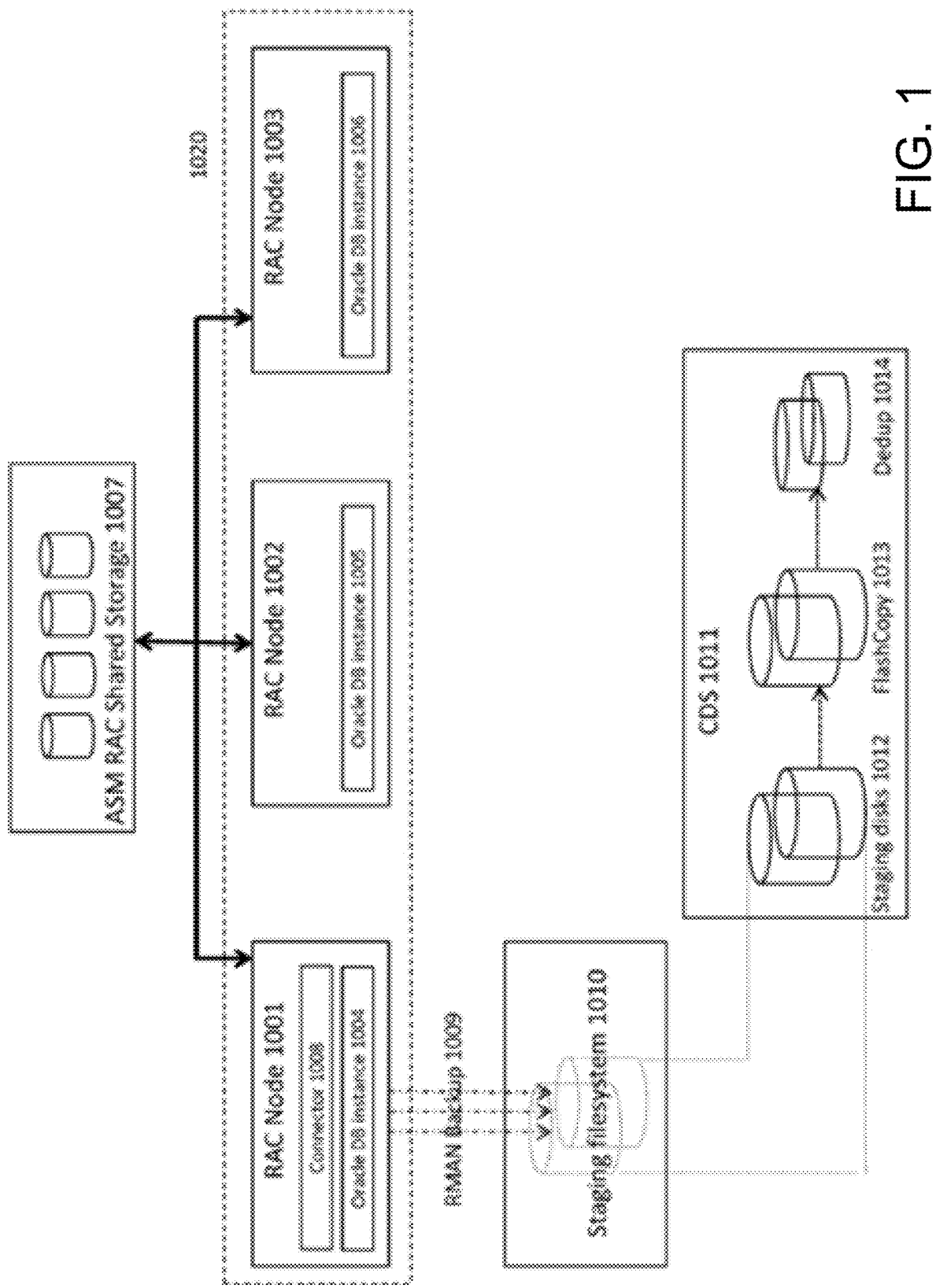
FIG. 1 is a system diagram showing an example of traditional out-of-band protection of a RAC database with a 3-node setup.

FIG. 1 is a system diagram showing an example of traditional out-of-band protection of a RAC database with 3-node setup. For illustration, FIG. 1 and some other examples described herein refer to Oracle-based systems, components and/or databases. However, such reference to Oracle-based systems is exemplary only, and it should be understood that any other database systems, components and databases can be used without departing from the spirit of the techniques described herein. Oracle RAC database 1020 includes RAC node 1001, RAC node 1002, and RAC node 1003. In some embodiments, a RAC node refers to a member host of Oracle Real Application Clusters, where there are one or more hosts making up the cluster. Oracle RAC instances 1004, 1005 and 1006 runs on their respective hosting nodes. A RAC instance refers to a database instance which is a member of the Oracle Real Application Clusters. Oracle RAC nodes 1001, 1002, and 1003, use ASM RAC shared storage 1007. Connector 1008 (e.g., Actifio Connector) is installed on RAC node 1001 and communicate with CDS 1011. Connector is a program running on each member node to facilitate communications between CDS and member node and to perform tasks (e.g., mapping disks onto a node) on the member node. Staging filesystem 1010 is created by connector 1008 for RMAN Backup 1009. RMAN backup 1009 refers generally to a backup process by a database client that performs backup, restore, and recovery of database files. CDS 1011 creates staging disks 1012 for Oracle RAC backup. Staging disks 1012 refer to disks made available to the filesystem 1010 for data backup. Staging disks 1012 are mapped to a single node (e.g., RAC node 1001) only. After RMAN Backup 1009 completes, CDS 1011 creates FlashCopy 1013 from staging disks 1012. FlashCopy 1013 refers generally to a point-in-time snapshot copy of a data set or volume. FlashCopy 1013 is further processed into Dedup storage 1014. Dedup storage 1014 refers generally to storage of deduplicated data.

CDS 1011 and Connector 1008 are responsible for backing up Oracle RAC database 1020, which resides on ASM RAC Shared Storage 1007 and is backed up onto the Staging filesystem 1010. CDS 1011 catalogs each of the backup details and corresponding FlashCopy 1013, which can be used for restore and Test & Dev operations at a user's discretion, as described in more detail in U.S. application Ser. No. 14/546,757, entitled "Test-and-Development Workflow Automation," filed Nov. 18, 2014, the contents of which are herein incorporated in their entirety.

Figure 2:
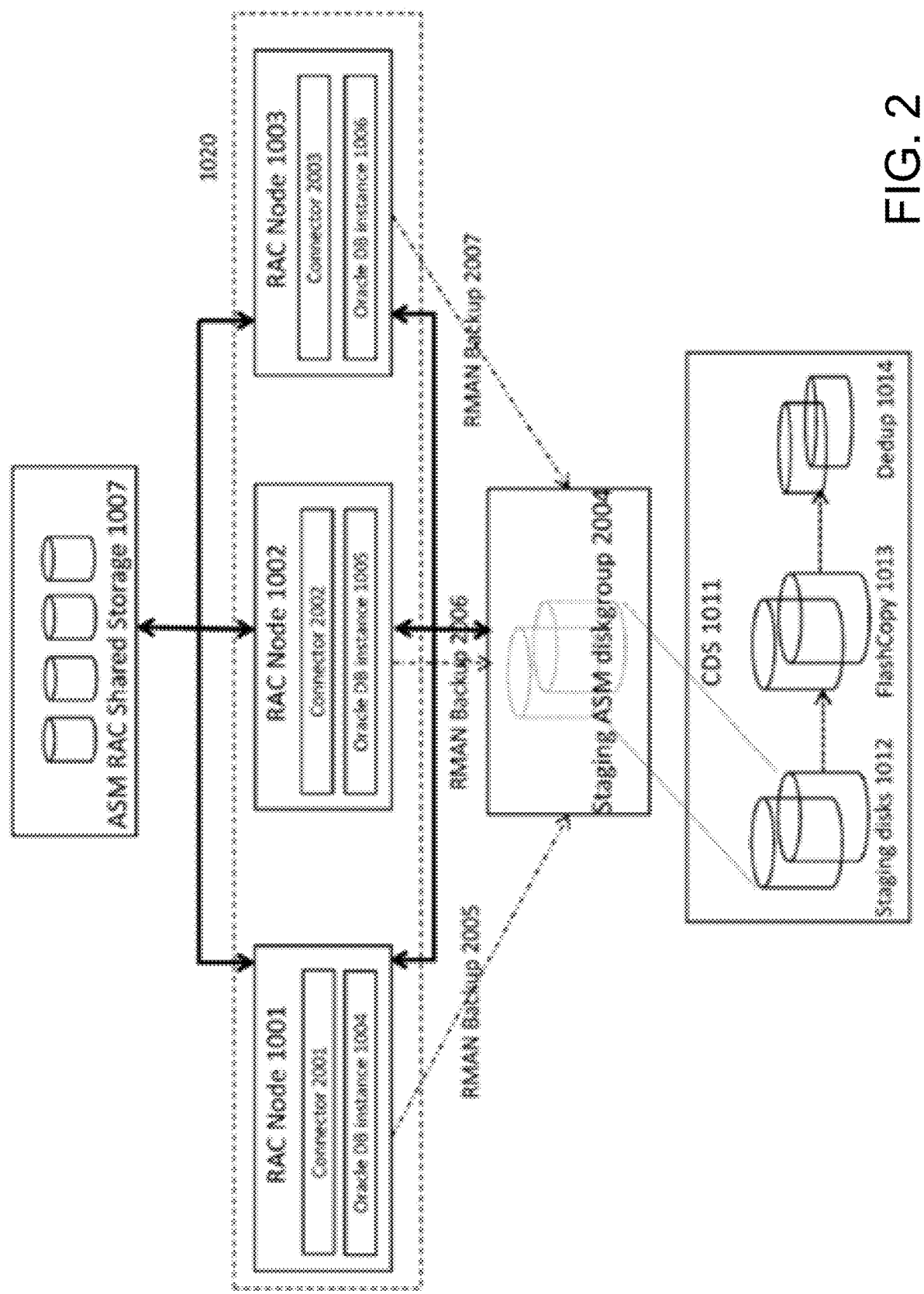
FIG. 2 is a system diagram showing a RAC backup method using an ASM diskgroup managed by a copy data storage system (CDS), according to some embodiments of the present disclosure.

FIG. 2 is a system diagram showing a RAC backup method using an ASM diskgroup managed by a copy data storage system (CDS), according to some embodiments of the present disclosure.

CDS 1011 and Oracle RAC database 1020 under protection is the same as those described in FIG. 1. CDS 1011 creates staging disks 1012 and maps them to all three RAC nodes 1001, 1002, and 1003. CDS 1011 initiates backup requests to Connector 2001. Connector 2001 adds the mapped staging disks to staging ASM diskgroup 2004 and mounts the staging diskgroup 2004 to a database instance 1004 1005 1006 on the RAC nodes 1001 1002 1003. A backup stream can be configured from multiple RAC nodes as staging ASM diskgroup 2004 is mounted on all RAC nodes. For example, a backup stream can contain data from any one of the DB instances 1004 1005 1006. As discussed above, each of the DB instances 1004 1005 1006 are instances of portions of data within ASM RAC shared storage 1007. Connector 2001 controls the RMAN backup 2005, as well as RMAN backup 2006 and 2007. Connector 2002 and 2003 process mapped disks on RAC node 1002 and 1003 when multiple nodes are configured to participating in the backup. Once the RMAN backup completes for Oracle RAC, Connector 2001 sends a message with backup details to CDS 1011. CDS 1011 then creates a FlashCopy 1013 and updates its management database on CDS 1011 for this backup. A management database is a persistent datastore on CDS 1011 where all backup information is stored. FlashCopy 1013 is further processed into Dedup storage 1014. Dedup storage 1014 refers generally to storage of deduplicated data.

Figure 3:
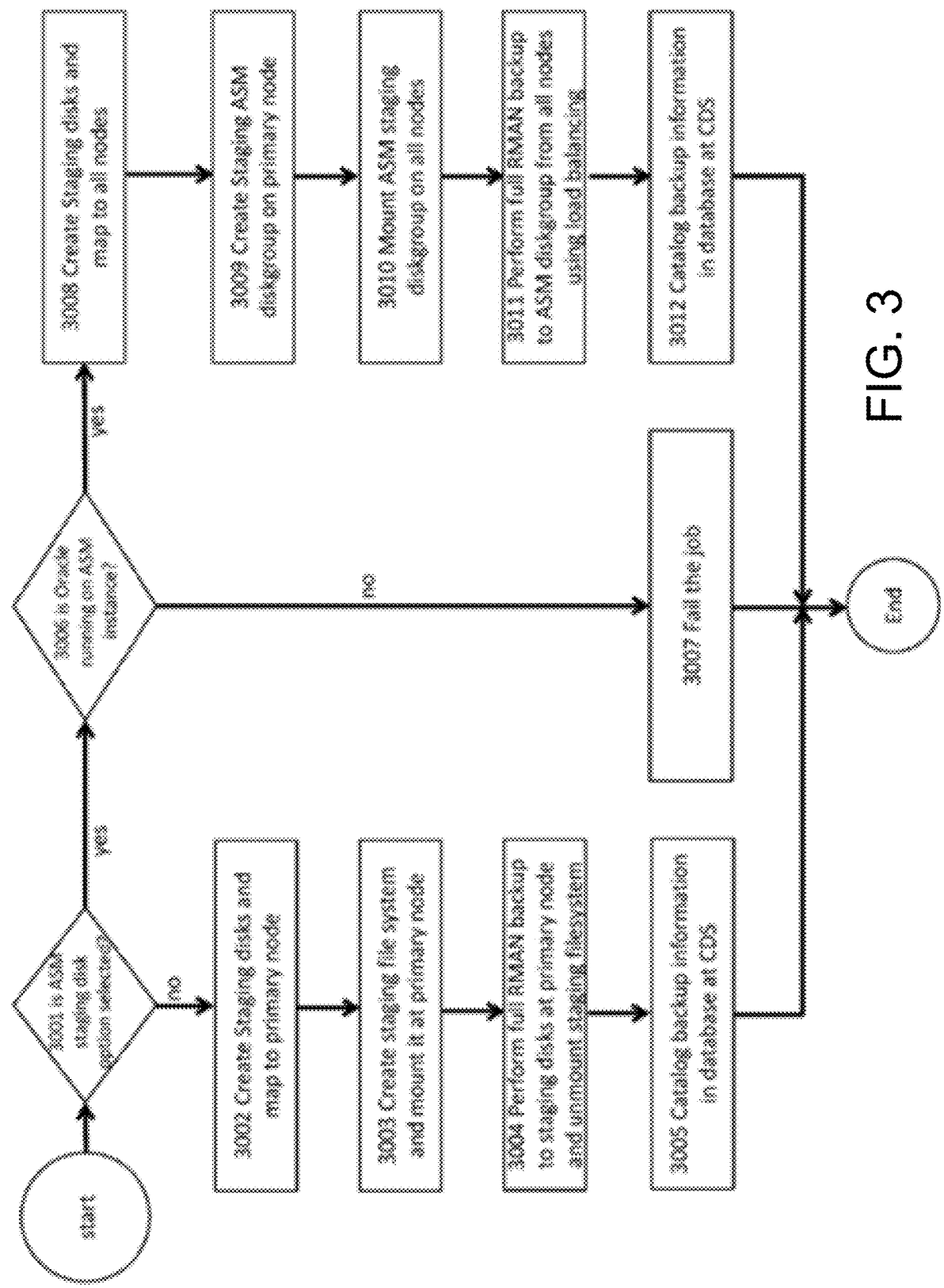
FIG. 3 is a flowchart for a first full backup of a RAC database managed by a CDS using ASM staging diskgroup as an option, according to some embodiments of the present disclosure.

FIG. 3 is a flowchart for a first full backup of a RAC database managed by a CDS using ASM staging diskgroup as an option, according to some embodiments of the present disclosure.

In some embodiments, a CDS user interface can provide an ASM Diskgroup 2004 as a staging disk option for an Oracle backup configuration. A user can select to use an ASM Diskgroup 2004 as a staging disk for an Oracle database backup. At step 3001, CDS 1011 checks whether ASM diskgroup 2004 is selected as a staging disk option. When this option is not selected, the backup moves to Step 3002, where CDS 1011 creates staging disks and maps them to the primary backup RAC node 1001. Referring to step 3003, Connector 1008 creates a staging filesystem 1010 and mounts it on the primary backup RAC node 1001. Referring to step 3004, Connector 1008 performs a full Oracle database backup using RMAN image copy 1009. Connector 1008 unmounts the staging filesystem at the conclusion of the RMAN backup 1009 and sends a message to CDS 1011. Referring to step 3005, CDS 1011 catalogs backup information of the Oracle RAC database in its management database.

Referring to step 3001, when using ASM diskgroup as staging option is selected, CDS 1011, at step 3006 checks whether an Oracle database is running on ASM. If it is not, CDS 1011 fails the backup in Step 3007. When Oracle database running on ASM diskgroup 2004 is verified at step 3008, CDS 1011 creates staging disks and maps them to all RAC nodes 1001 1002 1003. Referring to step 3009, Connector 2001 creates staging ASM diskgroup 2004 on the primary backup node 1001 with all staging disks mapped from step 3008. Referring to step 3010, Connectors 2001 2002 2003 mount ASM staging diskgroup 2004 on all Oracle RAC nodes 1001 1002 1003. Referring to step 3011, Connector 2001 performs a full backup from the primary backup RAC node 1001. RMAN backup 2005 2006 2007 can be running on multiple RAC nodes using load balancing when load balancing is configured. Load balancing for backup is multiple-nodes sharing the backup loads when there are more than one node is configured for the backup activity. At the conclusion of the RMAN backup, Connector 2001 sends a message to CDS to indicate either a successful backup or failure. Connector 2001 is the primary facilitator between CDS and Oracle RMAN to conduct the backup. Connector 2002 and 2003 are responsible to prepare mapped staging disks on RAC node 1002 and 1003 so that staging diskgroup will be available on all 3 RAC nodes when Connector 2001 creates and mounts the staging diskgroup. This can be performed when load balancing for the backup becomes available and is managed by the manager of the database (e.g., an Oracle database manager). Referring to step 3012, CDS 1011 catalogs the backup information of the Oracle RAC database in CDS management database.

Figure 4:
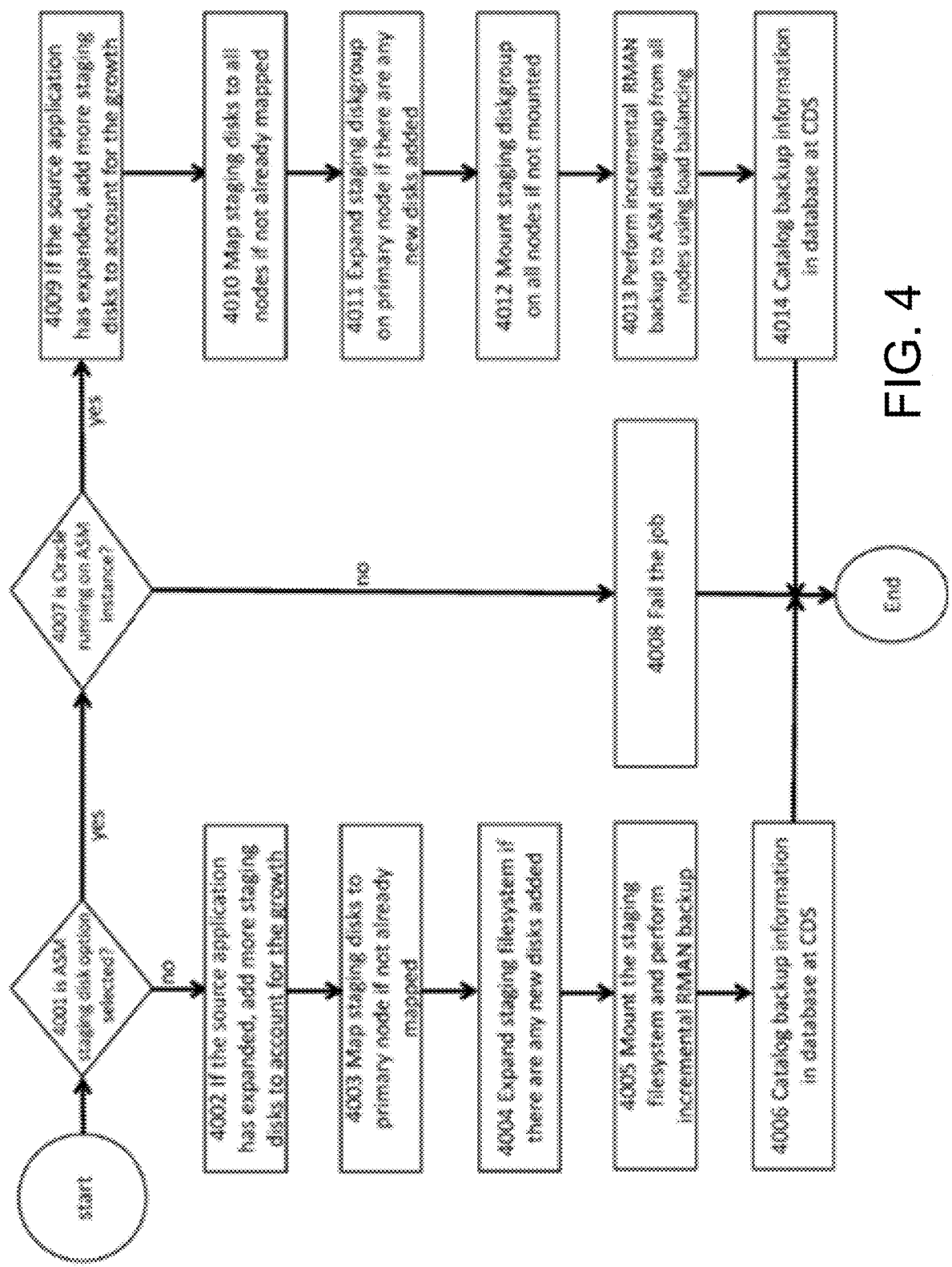
FIG. 4 is a flowchart for incremental backup of a RAC database managed by a CDS, according to some embodiments of the present disclosure.

FIG. 4 is a flowchart for incremental backup of a RAC database managed by a CDS, according to some embodiments of the present disclosure.

Referring to step 4001, CDS 1011 checks whether ASM diskgroup 2004 is selected as a staging disk option. If this option is not selected, at step 4002, CDS 1011 checks whether source Oracle RAC database 1020 has expanded its size, and adds more staging disks if database size increases. At step 4003, CDS 1011 maps staging disks to primary RAC backup node 1001 if these disks are not already mapped. Step 4004, Connector 1008 expands staging filesystem if there are new staging disks added due to source Oracle RAC database size increase. Step 4005, Connector mounts the staging filesystem and performs an incremental RMAN backup. At the conclusion of the backup, Connector sends message with backup details to CDS to complete the backup. Step 4006, CDS catalogs the backup information in CDS management database.

When CDS 1011 detects using ASM diskgroup as a staging disk option is selected at step 4001, CDS 1011 checks whether protected Oracle database 1020 is running on an ASM instance at step 4007. Referring to step 4008, CDS 1011 fails the backup if the Oracle database is not running on ASM. Referring to step 4009, CDS 1011 adds more staging disks if source Oracle RAC database 1020 has grown in size. This procedure can ensure that the backup will be incremental even when the source database grows in size. Referring to step 4010, CDS 1011 maps staging disks to all Oracle RAC nodes 1001 1002 1003 if not already mapped. Referring to step 4011, Connector 2001 adds any new staging disks to backup staging ASM diskgroup on primary RAC backup node 1001. Referring to step 4012, Connector 2001 mounts staging ASM diskgroup on all Oracle RAC nodes 1001 1002 1003 after Connector 2002 and 2003 prepares mapped staging disks on RAC nodes 1002 and 1003 if they are not already mounted. Referring to step 4013, Connector 2001 starts RMAN incremental backup 2005 2006 2007 from all backup RAC nodes using load balancing if the feature is configured. Connector 2001 sends message with backup information to CDS 1011 at the conclusion of the backup. Referring to step 4014, CDS 1011 catalogs backup information in CDS management database.

Figure 5:
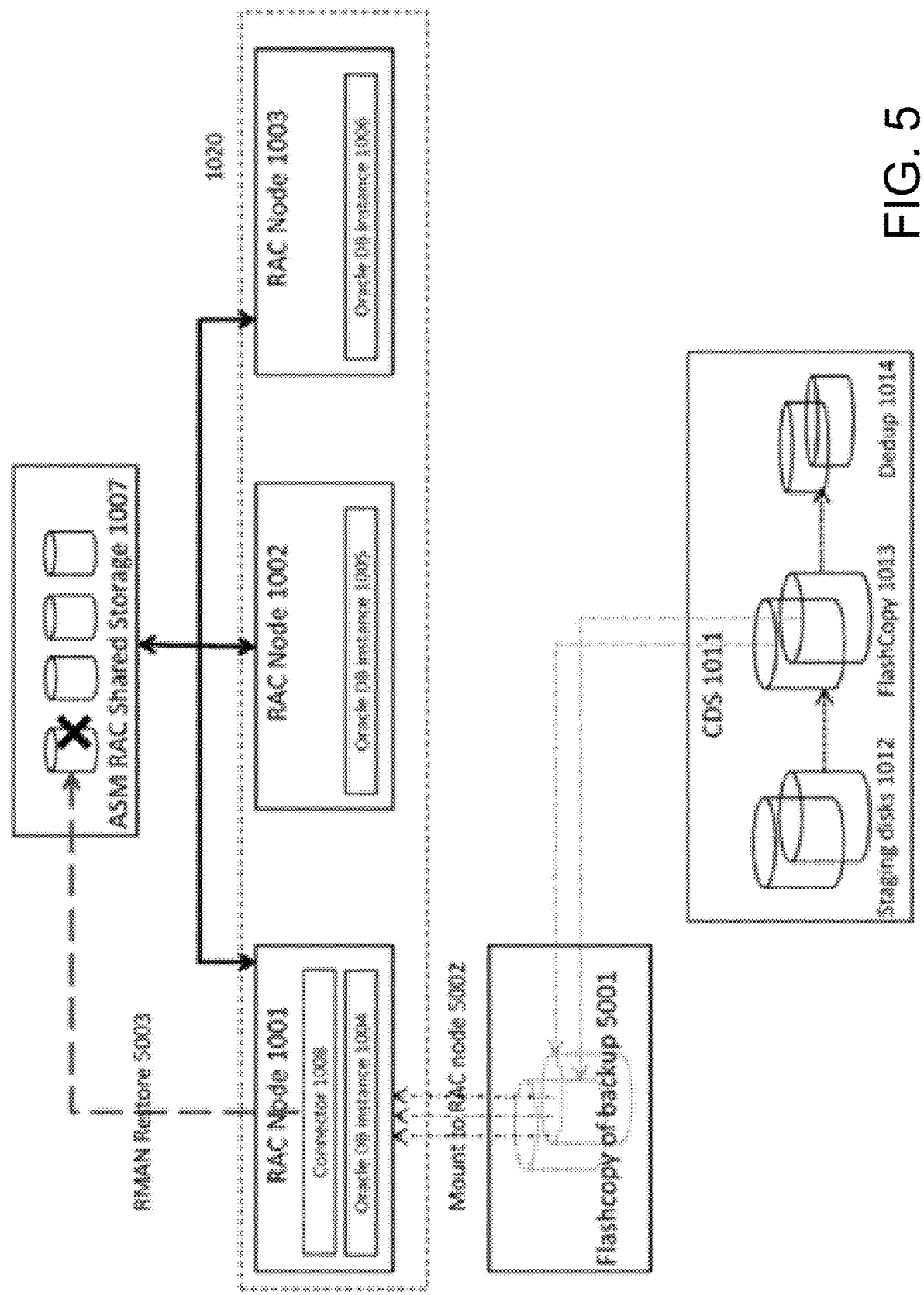
FIG. 5 is a system diagram showing traditional methods of restore of a RAC database from backup.

FIG. 5 is a system diagram showing traditional methods of restore of a RAC database from backup.

When Oracle RAC database 1020 encounters a storage array issue, for example one of the ASM disks becomes corrupt in ASM RAC Shared Storage 1007, a user can use CDS 1011 to select a restore point from FlashCopy 1013. CDS 1011 creates a FlashCopy of this backup 5001, and maps the disks to RAC node 1001. Connector 1008 mounts the filesystem from the mapped backup disks 5002. Once backup is mounted, RMAN Restore 5003 can use it to restore database, tablespace(s), or datafile(s) to ASM RAC Shared storage 1007. Although CDS 1011 can mount the backup image instantly, this process involves database downtime to allow the RMAN Restore 5003 to complete.

Figure 6:
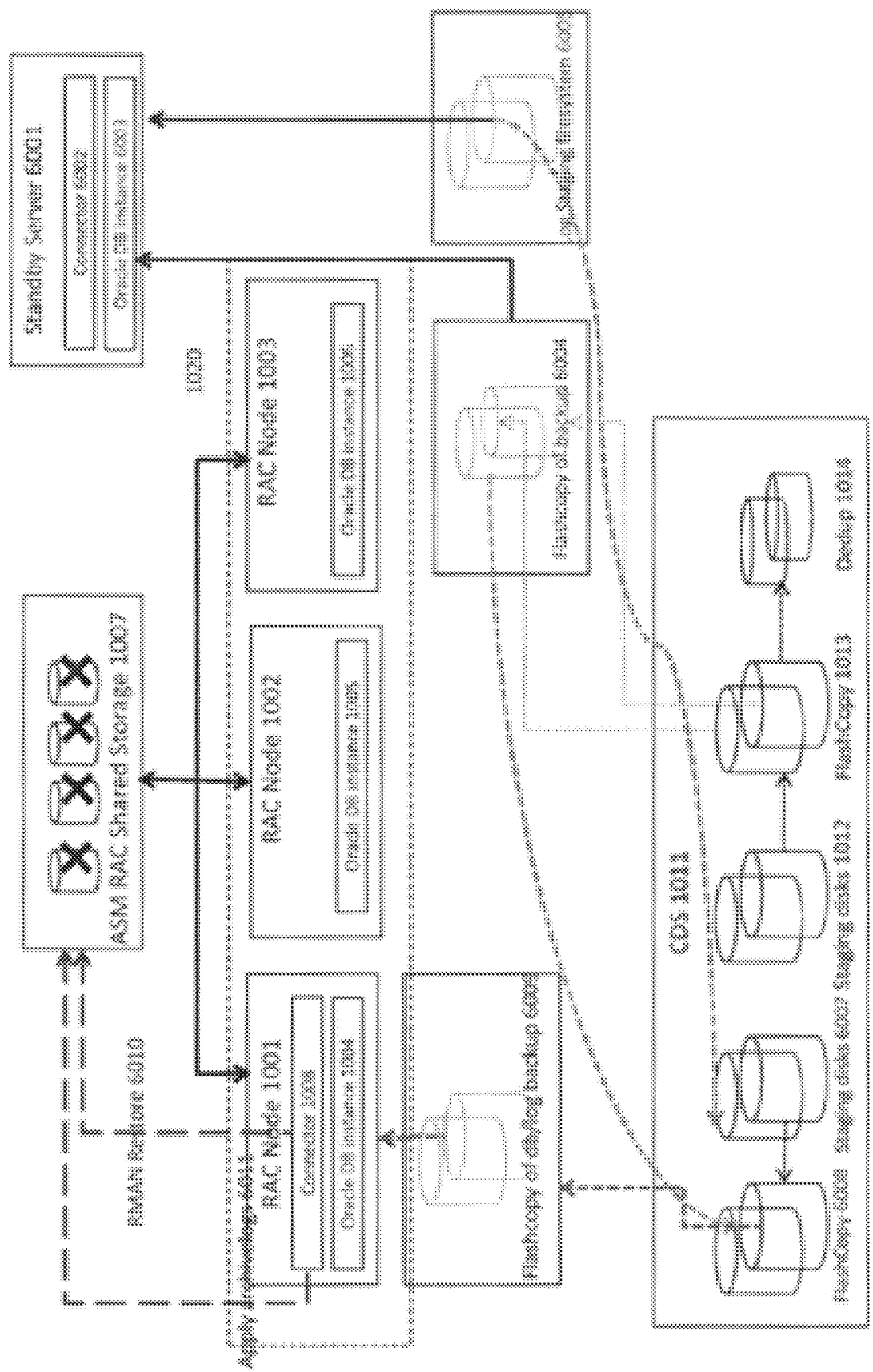
FIG. 6 is a system diagram illustrating a traditional method of restore of a RAC database with minimum database downtime, but with increased operational complexity.

FIG. 6 is a system diagram illustrating a traditional method of restore of a RAC database with minimum database downtime, but with increased operational complexity. This method requires a standby server 6001, and multiple phases for restore and data migration back to production storage.

When Oracle RAC database encounters a storage array issue, it can lead to failure of a production diskgroup(s). To minimize the database downtime, a user selects a restore point from backup image from CDS 1011, and uses Flash-Copy 1013 to create a FlashCopy of backup 6004. CDS 1011 maps disks from FlashCopy of backup 6004 to the standby Server 6001. Connector 6002 mounts the backup filesystem to Standby Server 6001. Connector 6002 starts a clone operation to clone Oracle DB instance 6003. Once clone operation completes, Oracle DB instance 6003 receives connections from application layer and serving requests, and consequently, database service is restored.

In order to migrate new transactional data received by newly cloned database back to production storage, Oracle DB instance 6003 is protected by CDS 1011. Both DB Staging filesystem 6004 and Log Staging filesystem 6005 are protected in band. Oracle DB instance 6003 will be protected by CDS in shorter intervals for both database datafiles 6004 and its archivelogs 6005.

Once ASM RAC Shared Storage 1007 is repaired, datafiles from Oracle DB instance 6003 can be restored back to production ASM RAC Shared Storage 1007. CDS 1011 creates Flashcopy of backup FlashCopy 6008 and maps disks to RAC Node 1001. Connector 1008 mounts the backup filesystem 6005 to RAC Node 1001. RMAN Restore 6010 restores database first and leaves the database in a mounted state. Connector 1008 mounts archivelog filesystem to RAC Node 1001 to allow RMAN to apply archivelogs 6011. Connector 1008 repeats the application of archivelogs after a new archivelog backup becomes available from the cloned Oracle DB instance 6003 of Standby Server 6001. Connector 1008 then schedules a maintenance window for downtime, shuts down cloned Oracle DB instance 6003, and takes the last archivelog backup and applies the last backup to Oracle DB Instance 1004 on RAC Node 1001. The Oracle RAC database with all data migrated from cloned Oracle DB instance 6003 can now be opened.

Figure 7:
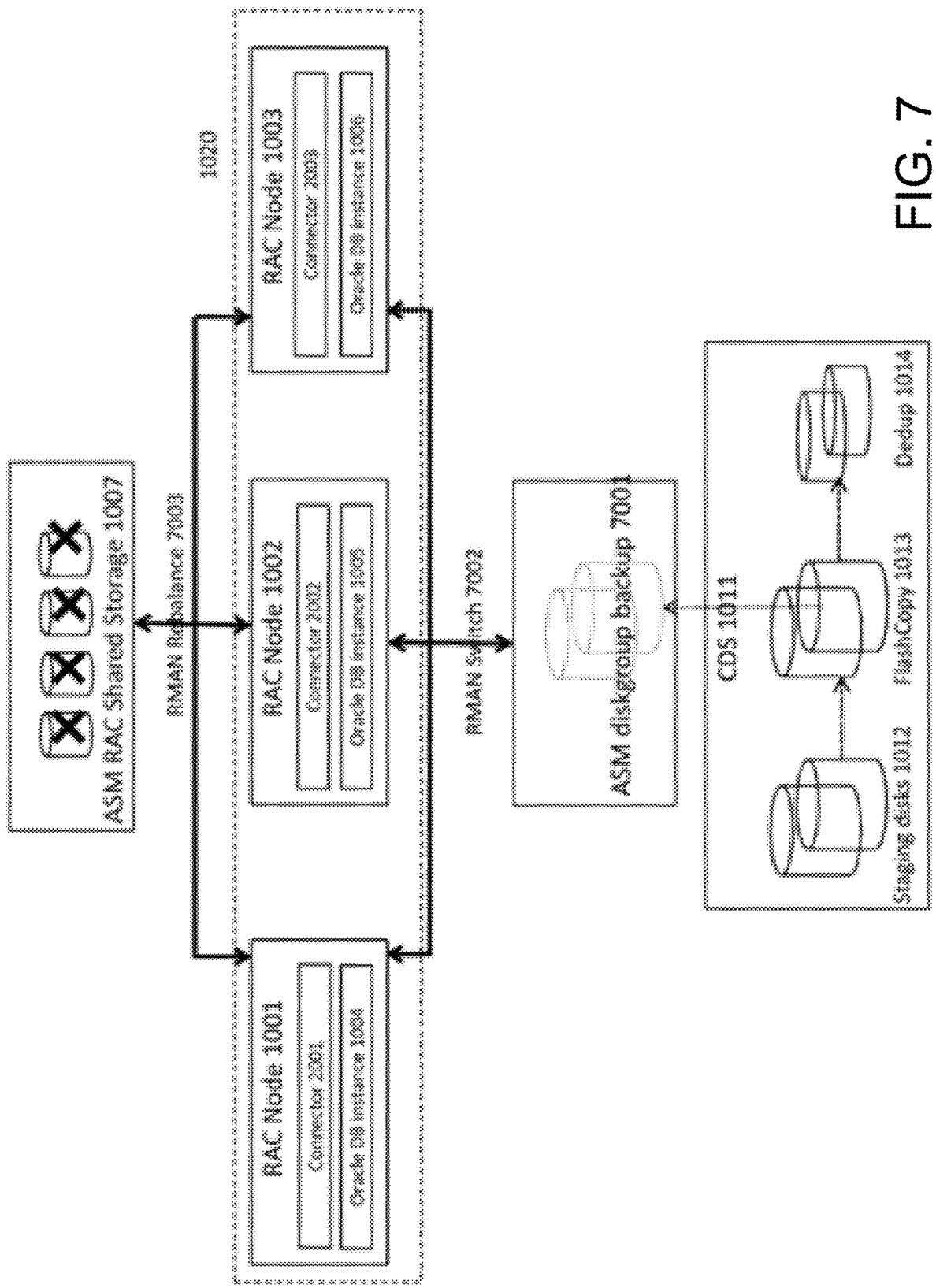
FIG. 7 is a system diagram illustrating a restore method with an ASM staging disk based backup with instant restore and no downtime data migration, according to some embodiments of the present disclosure.

FIG. 7 is a system diagram illustrating a restore method with an ASM staging disk based backup with instant restore and no downtime data migration, according to some embodiments of the present disclosure.

Once ASM RAC Shared Storage 1007 encounters storage issues and Oracle RAC database is down, CDS 1011 creates FlashCopy from backup FlashCopy 1013. CDS 1011 maps disks to RAC Nodes 1001, 1002, 1003. Connector 2001 mounts ASM backup diskgroup 7001 to RAC node 1001. Connector 1001 issues RMAN switch 7002 and Oracle RAC database 1020 is running from ASM backup diskgroup 7001. All new writes can go to ASM backup diskgroup 7001. After ASM RAC Shared Storage 1007 is repaired, RMAN Rebalance 7003 can migrate data from ASM backup disks 7001 to ASM RAC Shared Storage 1007. User can remove ASM diskgroup disks 7001 after rebalance completes and all data is migrated onto ASM RAC Shared Storage 1007. In some embodiments, ASM attempts to spread the data evenly across all disks in a diskgroup. When a disk is added or removed from a diskgroup, ASM can re-spread all data files across the new disk layout, which is referred to herein as rebalance.

Figure 8:
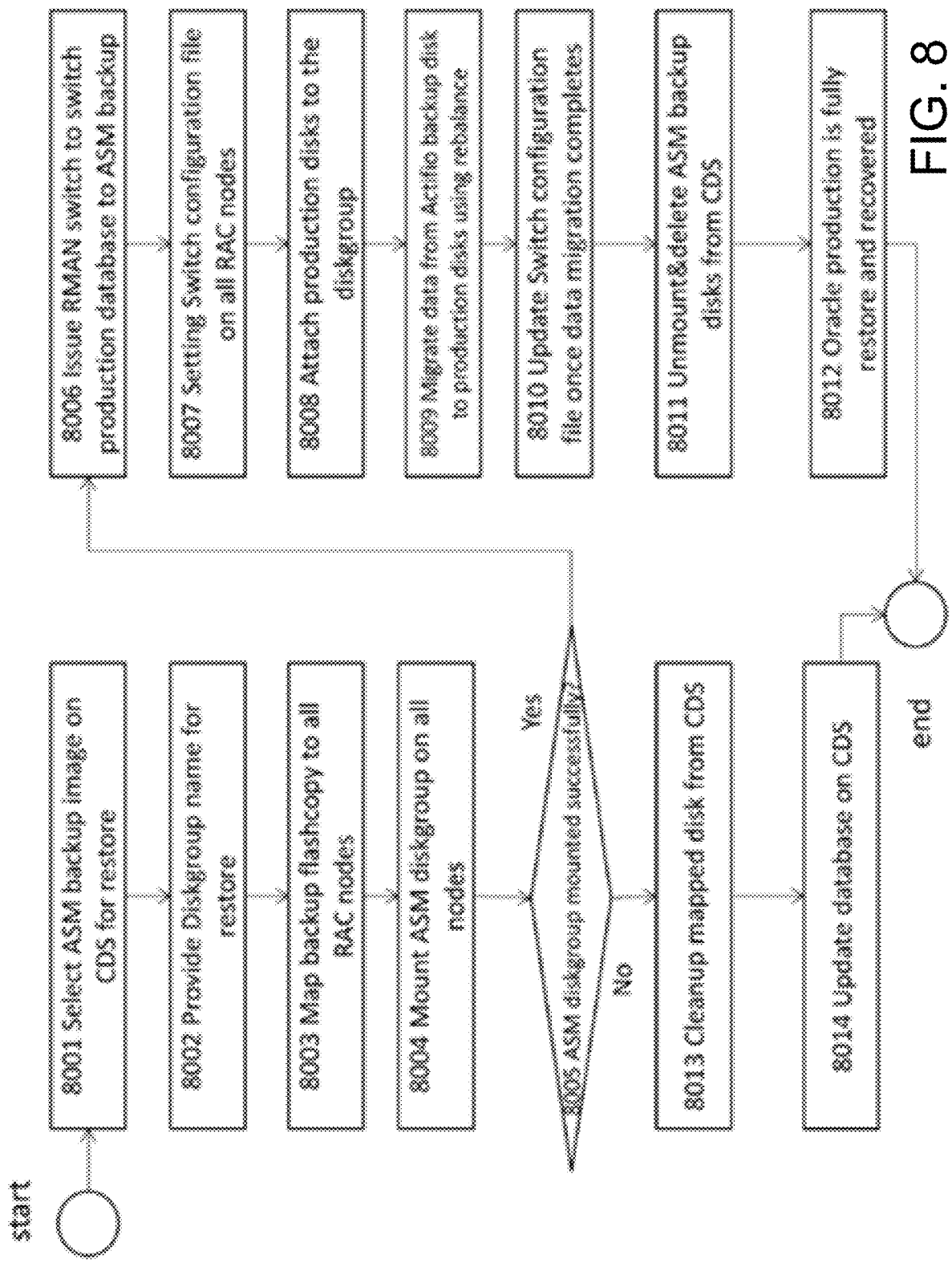
FIG. 8 is a flowchart showing the restoration of a RAC database using ASM backup, according to some embodiments of the present disclosure.

FIG. 8 is a flowchart showing the restoration of a RAC database using ASM backup, according to some embodiments of the present disclosure.

At step 8001, a user selects an ASM backup image on CDS 1011 for restore. At step 8002 CDS 1011 prompts user for a preferred Diskgroup name to be used for restore. At step 8003 CDS maps ASM backup flashcopy disks to all RAC nodes 1001 1002 1003. At step 8004 Connector 2001 mounts ASM diskgroup on all RAC nodes 1001 1002 1003. If mounting diskgroup fails 8005, at step 8013, Connector 2001 unmaps ASM flashcopy from RAC nodes 1001 1002 1003. At step 8014, CDS 1011 updates the management database.

If mount ASM diskgroup is successful 8005, Connector 2001, at step 8006, issues RMAN Switch to switch production database to ASM diskgroup mounted by CDS 1011. A lock file for managing RMAN lifecycle is created on all RAC nodes 8007. The lock file is a file with attributes denoting the database name in the switch process and status of the switch process. Once the Oracle ASM production storage issue is resolved, the production disks are repaired at step 8008 by adding production disks to a restore diskgroup. At step 8009, data migration is started from ASM backup disks to production disks using rebalance and ASM backup disks are dropped from the restore diskgroup. In some embodiments, dropping a disk from a diskgroup refers to removing a disk from the diskgroup. In some embodiments, the removal of the disk does not take place until after rebalancing is complete. At step 8010 rebalance status is updated in lock file on all nodes to allow cleanup of ASM disks. At step 8011, users can unmount and delete ASM backup disks from all RAC nodes and from CDS. At step 8012, Oracle RAC database is fully restored back to production storage.

Figure 9:
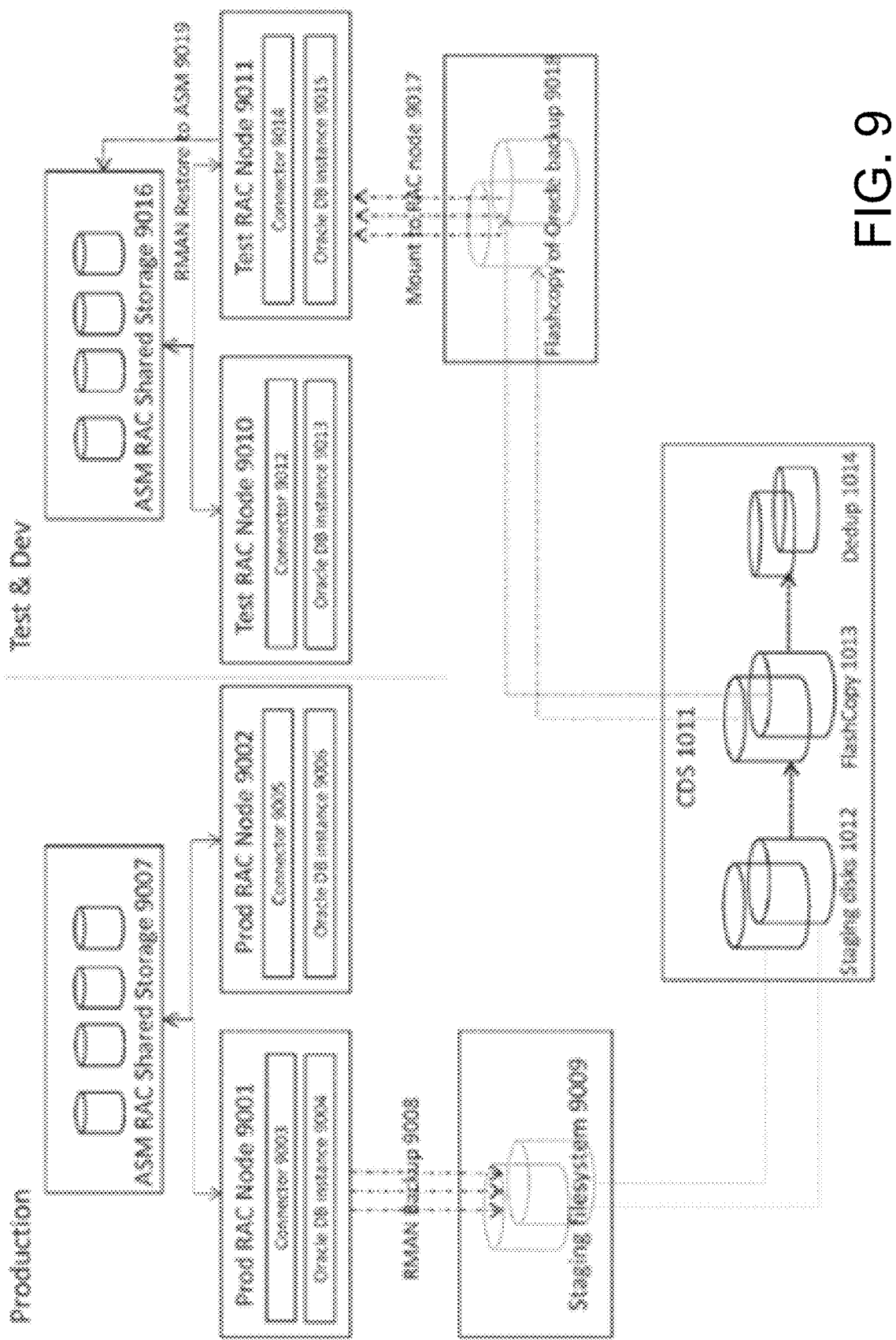
FIG. 9 is a system diagram showing a provisioning of a test and development RAC database (2-node) from backup.

FIG. 9 is a system diagram showing a provisioning of a test and development RAC database (2-node) from backup. When Test & Development requires Oracle RAC setup, the existing method is to use RMAN restore to an ASM diskgroup, which takes up the same amount of storage footprint as in production and can be expected to take time linearly proportional to the production backup size.

CDS 1011 backs up Production RAC database Node 9001 9002 onto Staging filesystem 9009, backup images created as FlashCopy 1013. When a Test & Development provision requests comes, CDS 1011 creates Flashcopy of Oracle backup 9018 from FlashCopy 1013. The disks from Flashcopy of Oracle backup 9018 are mapped to Test RAC Node 9011. Connector 9014 mounts the backup filesystem to Test RAC Node 9011. RMAN Restore to ASM diskgroup 9019 restores Oracle backup to ASM RAC Shared Storage 9016. Test Oracle DB Instance 9015 can be opened for READ and WRITE for testing.

Figure 10:
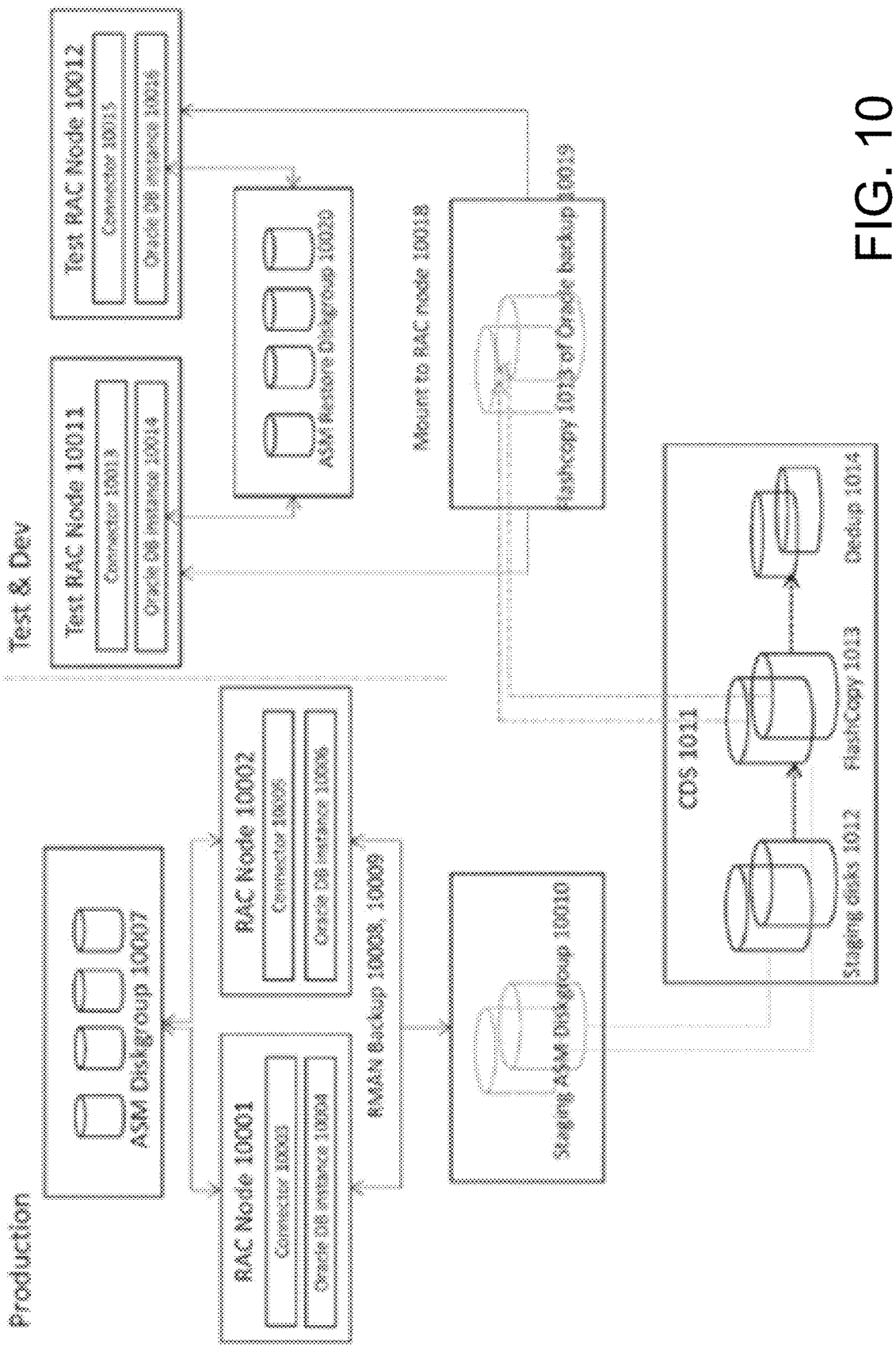
FIG. 10 is a system diagram showing a provisioning of a test and development RAC database (2-node) from an ASM backup, according to some embodiments of the present disclosure.

FIG. 10 is a system diagram showing a provisioning of a test and development RAC database (2-node) from an ASM backup, according to some embodiments of the present disclosure. The systems and methods described herein can provision a multi-node RAC that requires a near zero storage footprint and take near constant time regardless of the size of the production backup.

CDS 1011 backs up Oracle RAC database from RAC Node 10001 and 10002 using ASM diskgroup as the staging disk. To provision a 2-node RAC database in Test & Dev, CDS creates disks 10019 from FlashCopy 1013 and maps them to Test RAC Node 10011 and Test RAC Node 10012. Connector 10013 adds mapped ASM backup disks 10019 to an ASM restore diskgroup 10020 and mounts the diskgroup to ASM instance (not shown) running on Test RAC node 10011 and 10012. In some embodiments, an ASM instance is required to run on all RAC nodes in order for the RAC to function. In some embodiments, an ASM instance is a small and lightweight database instance that manages disks in a disk group and controls administrative tasks for the disk group (e.g., an Oracle instance that manages the disks in the ASM diskgroups and administrative works related to ASM). Connector 10013 starts clone operation using ASM Restore diskgroup 10020. Once the clone operation completes, an Oracle RAC database with 2 instances Oracle DB instance 10014 on Test RAC Node 10011 and Oracle DB instance 10016 on Test RAC Node 10012 opens in READ/WRITE mode. As there is no data movement in this managed Oracle RAC clone process, the time required to finish the clone is near constant and storage footprint is near zero.

Figure 11:
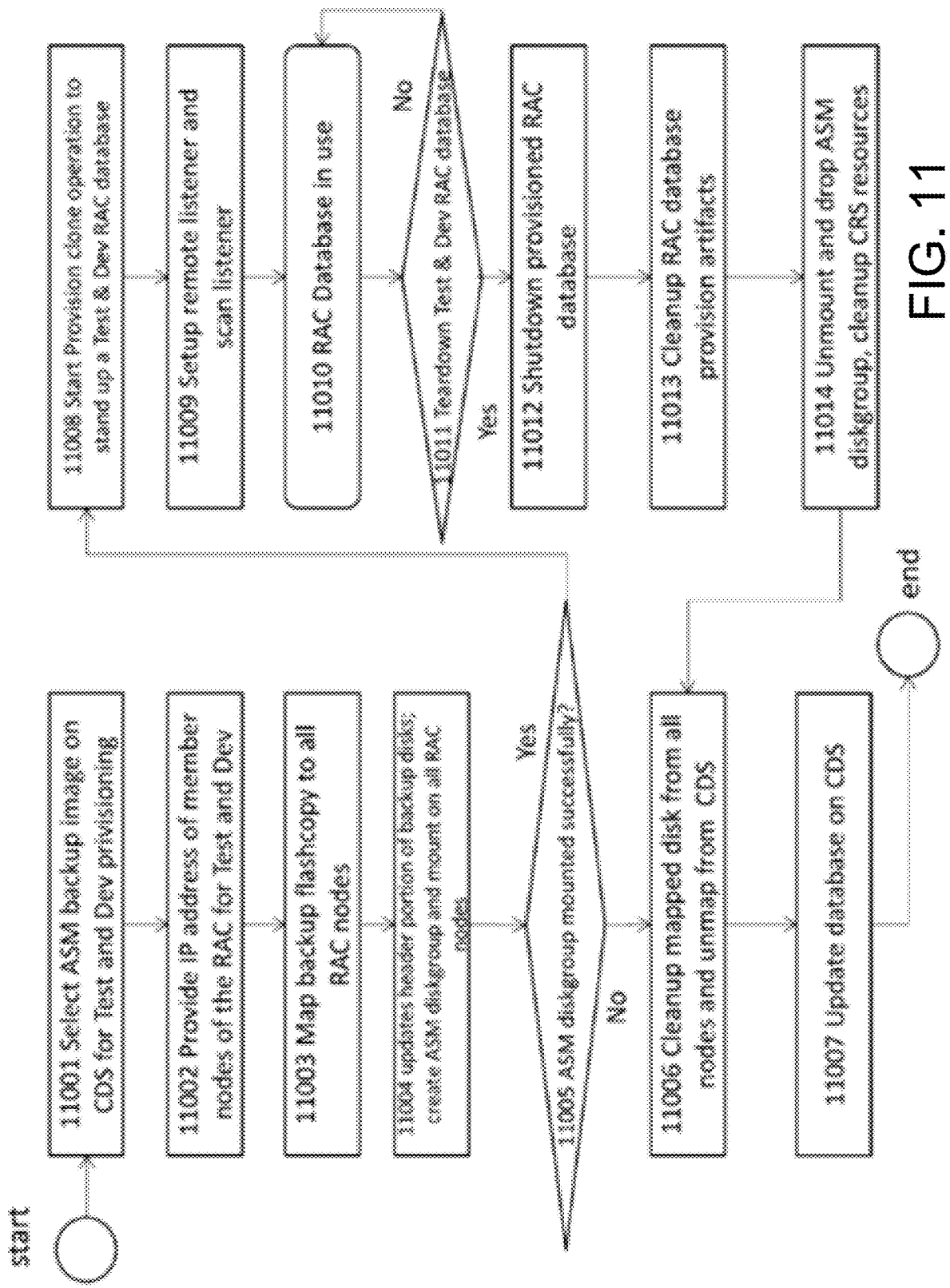
FIG. 11 is a flowchart showing a process of provisioning a test and development RAC database using ASM diskgroup based backup, according to some embodiments of the present disclosure.

FIG. 11 is a flowchart showing a process of provisioning a test and development RAC database using ASM diskgroup based backup, according to some embodiments of the present disclosure.

At step 11001, a user selects an ASM backup image on CDS for Test and Dev instance provisioning. At step 11002, a CDS user interface provides an option for a user to enter IP addresses of member nodes where RAC instances will be running from.

At step 11003, CDS maps disks off backup flashcopy to all RAC member nodes.

Step 11004, Connector updates header of backup ASM disks with new diskgroup name, creates the new diskgroup with modified backup ASM disks and mounts the diskgroup on all RAC member nodes.

Step 11005, CDS checks the mount status of the new ASM diskgroup. If mount fails, at step 11006, mapped disks from all nodes are cleaned up and unmapped from CDS. At step 11007, CDS updates management database.

If mount is successful in step 11005, at step 11008, Connector starts provision clone operation from primary RAC node, creating new parameter files, set new RAC database name, communicate with other member node(s) for RAC database clone. The communication with other member nodes includes setting up parameter file for RAC instance and required directory structures. At step 11009, Connector setups remote listener and scan listener, and open RAC database. The listener is a separate process that runs on the database server. It receives incoming client connection requests and manages the traffic of these requests to the database. At step 11010, Test & Dev RAC database is in use, serving requests from the application layer. At step 11011, user can use Test & Dev lifecycle management, which is provided by CDS, and check whether it is time to tear down the RAC database. CDS Test & Dev lifecycle management allows creation of a database instance for Test & Dev use and teardown the database and cleanup all its resources. At step 11012, Connector tears down the Test & Dev database by shutting down a provisioned RAC database. At step 11013, Connector cleanups artifacts generated as a result of provisioned RAC database. At step 11014, Connector unmounts and drops ASM diskgroup, cleanup CRS (Oracle Cluster Ready Services) resource. At step 11006, CDS cleanups mapped ASM disks from all nodes and unmaps from CDS. At step 11007, CDS updates management database.

Automated Workflow to Restore a Database

Systems and methods described herein provide for an automated workflow to restore an Oracle database running on ASM in very short time regardless of the size of the database. It provides an automated workflow to migrate restored database back to production storage seamlessly without any down time. Systems and methods described herein can also provide a capability of migration of test&dev database to different storage tier, as well as migrating Oracle database running from files system to a diskgroup.

Figure 12:
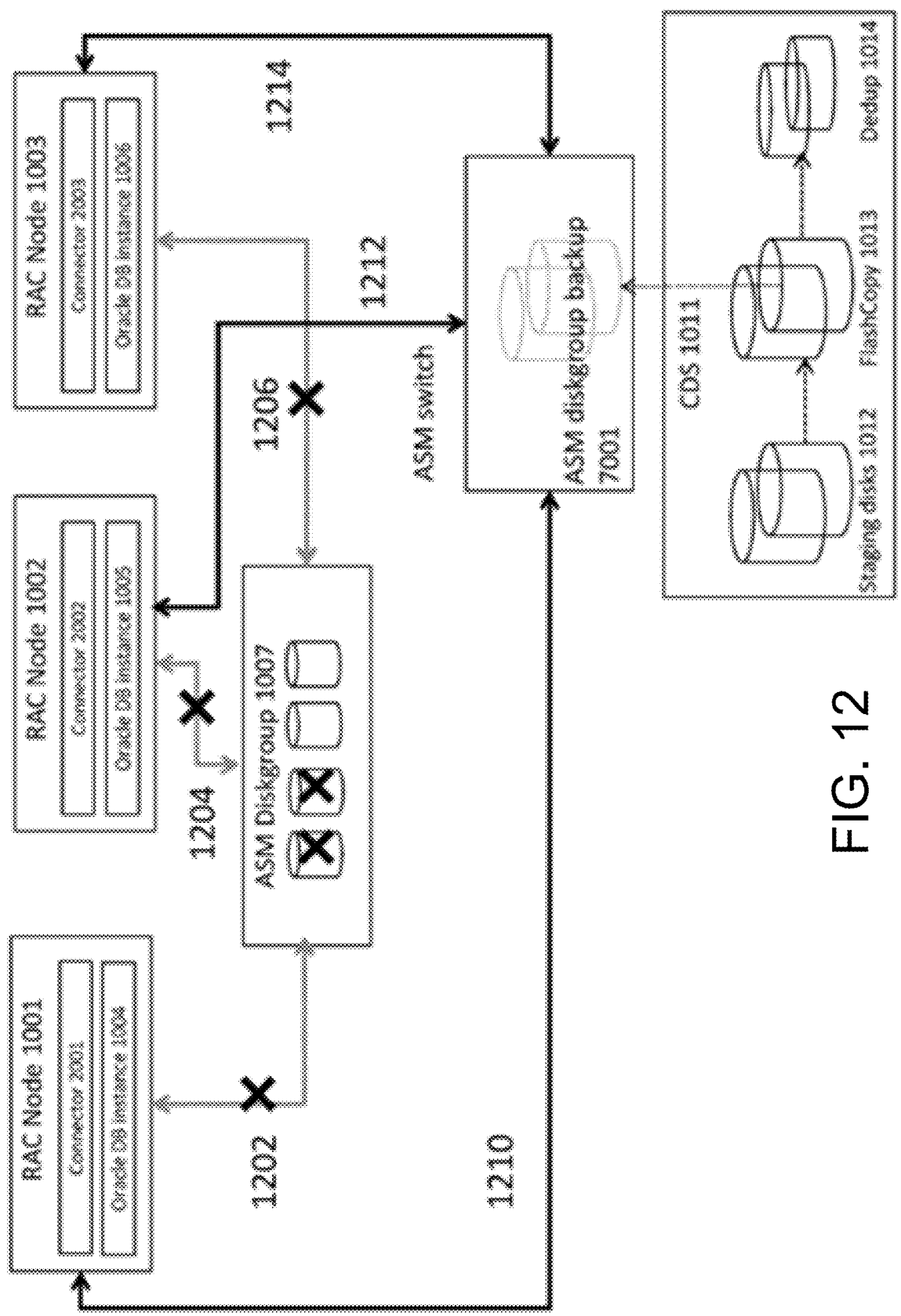
FIG. 12 is a system diagram showing a restore of a database using switching, according to some embodiments of the present disclosure.

FIG. 12 is a system diagram showing a restore of a database using switching, according to some embodiments of the present disclosure. FIG. 12 shows a 3-node Production RAC database, with database instance 1004, 1005, 1006 running on RAC node 1001, 1002 and 1003 respectively, using diskgroups from ASM 1007. ASM diskgroup 1007 can be a logical abstraction layer, which has physical disks (also referred to herein as "devices") associated with the logical abstract layer. ASM diskgroup 1007 has 4 disks representing four devices; an x on the disk indicates a failure/corruption. When any of the devices in ASM diskgroup 1007 becomes corrupted, it takes down ASM diskgroup 1007. This event results in database instance 1004, 1005, 1006 not being able to access the diskgroups in ASM shared storage 1007 through data path of 1202, 1204, and 1206. As described above in FIGS. 2-11, CDS 1011 has the backup of this ASM RAC shared storage 1007 in ASM diskgroup backup 7001. Once the automated workflow described in more detail below is invoked, it can provide a flashcopy from the backup image to restore the database using a switch 1210 1212 1214. As used herein, a switch refers to swapping out a device in which to bring up the database. For example, if a user application is accessing information from a first device, a switch would refer to the user accessing the same information on a second device (i.e., a device that contains the backup copy and made available to ASM). When a switch occurs, underlying datafiles point to a different location. The database uses the new datafile location to bring up the database.

Figure 13:
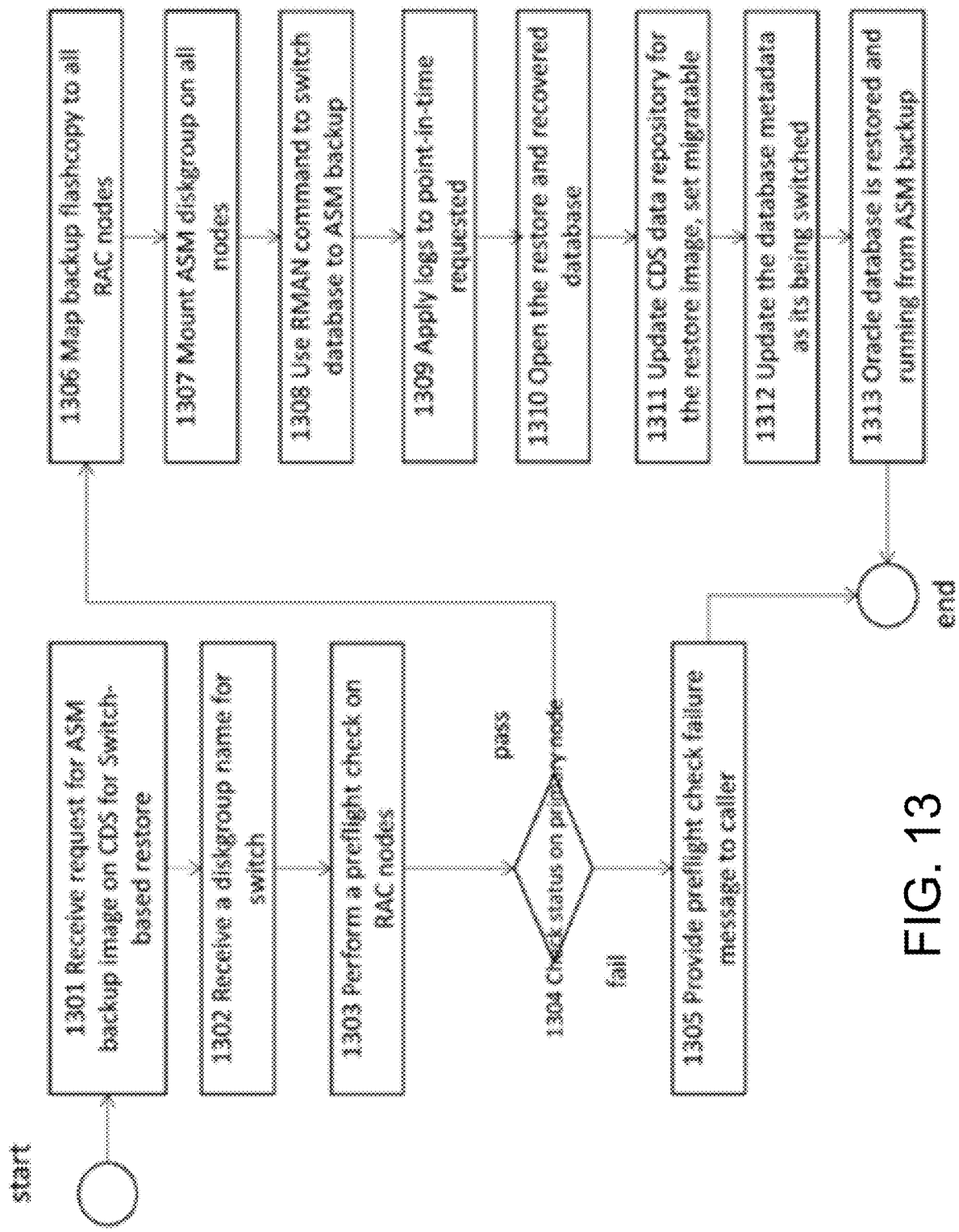
FIG. 13 is a flowchart showing a restore of a database using a switch operation, according to some embodiments of the present disclosure.

FIG. 13 is a flowchart showing a restore of a database using a switch operation, according to some embodiments of the present disclosure.

Referring to step 1301, CDS 1011, which is executing the process of automated workflow as described herein, receives a request for an ASM backup image on CDS for a switch-based restore. In some embodiments, the request is received from a human operator. For example, a database administrator (DBA) who manages the database operations can initiate a restore request to start a restore upon a database failure. The request is to restore a database using switch.

Referring to step 1302, CDS 1011 receives an ASM diskgroup name to be used during switch. In some embodiments, the diskgroup name is received through a user interface as shown in FIG. 17.

In some embodiments, the disk group name is required field during an ASM Switch process. For example, a user can be prompted to provide a unique disk group name that is not in use. If the user provides an original disk group name, the user can be prompted to drop the disk group from the ASM and make sure that name is not available under ASM in the RAC cluster. The diskgroup name can be the original diskgroup name used by the database, or a new name. The system can perform a validation for the name provided (either in the text field in GUI or through CLI parameter) using, for example, a diskgroup naming convention. CDS 1011 performs a preflight check on the RAC database nodes 1001 1002 1003. A preflight check refers to performing a check of the RAC nodes 1001 1002 1003 to ensure that the requested backup image can be restored using switch. In some embodiments, the preflight check includes a checklist. The checklist can include items such as validating a user to be used in the restore, checking whether the requisite software used to perform the restore exists in the proper location; checking whether Oracle Cluster Ready Services (CRS) and ASM is running; checking whether the ASM diskgroup provided in step 1302 exists; and whether an Oracle database to be restored to is running. In some embodiments, the failure of any item in the preflight check will disable starting of a switch. Once disabled, a message can be displayed to human operator such that the situation can be rectified. Once the situation is rectified, a rerun of preflight check can check again.

As described above, the preflight check can include validating a user to be used in the restore. This process can include checking for the existence of the user, and execution rights of the user to run a switch operation. In certain embodiments, it includes checking whether an Oracle OS user (owner of Oracle binary) is a valid user. In certain embodiments, it includes verifying whether a user has execution rights to Oracle OS. In certain embodiments, it includes verifying that an Oracle OS user has correct permission and ownership of ORACLE HOME or Oracle binary.

As described above, the preflight check can include checking whether the requisite software used to perform the restore exists in the proper location. This process can include verification of the location existence and ownership of this location in relationship with the user provided. In certain embodiments, it includes verifying that Oracle RAC CRS service is running. In certain embodiments, it includes verifying that an ASM instance is running. In certain embodiments, it includes verifying that an Oracle database binary is installed.

As described above, the preflight check can include checking whether Oracle Cluster Ready Services (CRS) and ASM are running. This can involve status checks of both services using API provided by Oracle.

As described above, the preflight check can include checking whether the ASM diskgroup provided in step 1302 exists. As described above, CDS 1011 can receive a diskgroup name used for the switch. In some embodiments, the diskgroup name provided should not exist in order to be used in switch. If an original diskgroup name is used, the original diskgroup should be dropped by an external user action prior to preflight check.

As described above, the preflight check can also include checking whether an Oracle database to be restored to is running. This step checks the running process of the database and fails if it is running. In certain embodiments, this includes checking a database process monitor (PMON) and/or system monitor (SMON) to verify that they are not being running for the database to be restored. In some embodiments, user has to shut down the database if restore using switch is not due to storage failure, in which case database would be already down.

Referring to step 1304, CDS 1011 checks a status of each item in the checklist of the preflight check. Each of the checklist items can be associated with a pass or fail status depending on the results of the preflight check. For example, when a user is validated, that item in the preflight checklist can be tagged with an "OK" status. When the user is not validated, the user validation item in the preflight checklist can be tagged with a "Failed" status. As shown in FIG. 18 below, preflight GUI can translate passing of the item to a graphic representation using a green checkmark. Also as shown in FIG. 18 below, CLI can display the status (OK1Failed), and a corresponding message when an item fails the check.

Referring to step 1305, if any item in the checklist fails, CDS 1011 can alert an operator (e.g., a database administrator (DBA)) with a failure message. A failure message indicates the reason of the failure. The operator can address the problem and rerun the preflight check.

Referring to step 1306, when the preflight passes, CDS 1011 creates, on CDS 1011, a backup flashcopy or flashcopies 1013 from a backup image, and maps them to all nodes in the RAC (1001, 1002, 1003). CDS 1011 then maps a flashcopy 1013 to all RAC nodes and sends message to each RAC member node (1001, 1002, 1003). In some embodiments, associated portions of the flashcopy 1013 are mapped to a respective node (1001 1002 1003). In some embodiments, the associated portions including data in the flashcopy 1013 relevant, controlled by, or otherwise used by a node (1001 1002 1003). Metadata captured during backup are also sent back as part of message which can be used by switch operation.

Referring to step 1307, connector software (2001, 2002, 2003) on each RAC node (1001, 1002, 1003) mounts the flashcopy provided in step 1302 to the ASM as ASM diskgroup 7001. In some embodiments, connector 2001 2002 2003 can make changes on the disk header to set the diskgroup name. Connector on the primary node then mounts the diskgroup to ASM using these disks (flashcopies).

Referring to step 1308, once ASM diskgroup 7001 is mounted, connector software on primary RAC node (2001) executes a switch command using RMAN API to start the restoration of the database using ASM diskgroup 7001.

Referring to step 1309, connector software applies archivelog to a point-in-time if this time is provided in the message body received in step 1306. Archivelog includes changes made to data since a last backup image was taken. Using RMAN recover API with applying archivelog to the flashcopy or flashcopies of the backup image, the switched database can be recovered until the time specified.

Referring to step 1310, connector software opens the switched and recovered database. The database now is ready to accept and respond requests from other applications using it before it went down.

Referring to steps 1311 and 1312, connector software sends successful message to CDS, and CDS has the restore image (flashcopy created from backup image) migratable and switched flag set and its metadata updated so that this image can be used in migration operation, e.g. rebalance.

Referring to step 1313, database now is restored using switch and running from a virtualized copy of ASM backup image (1013).

Figure 14:
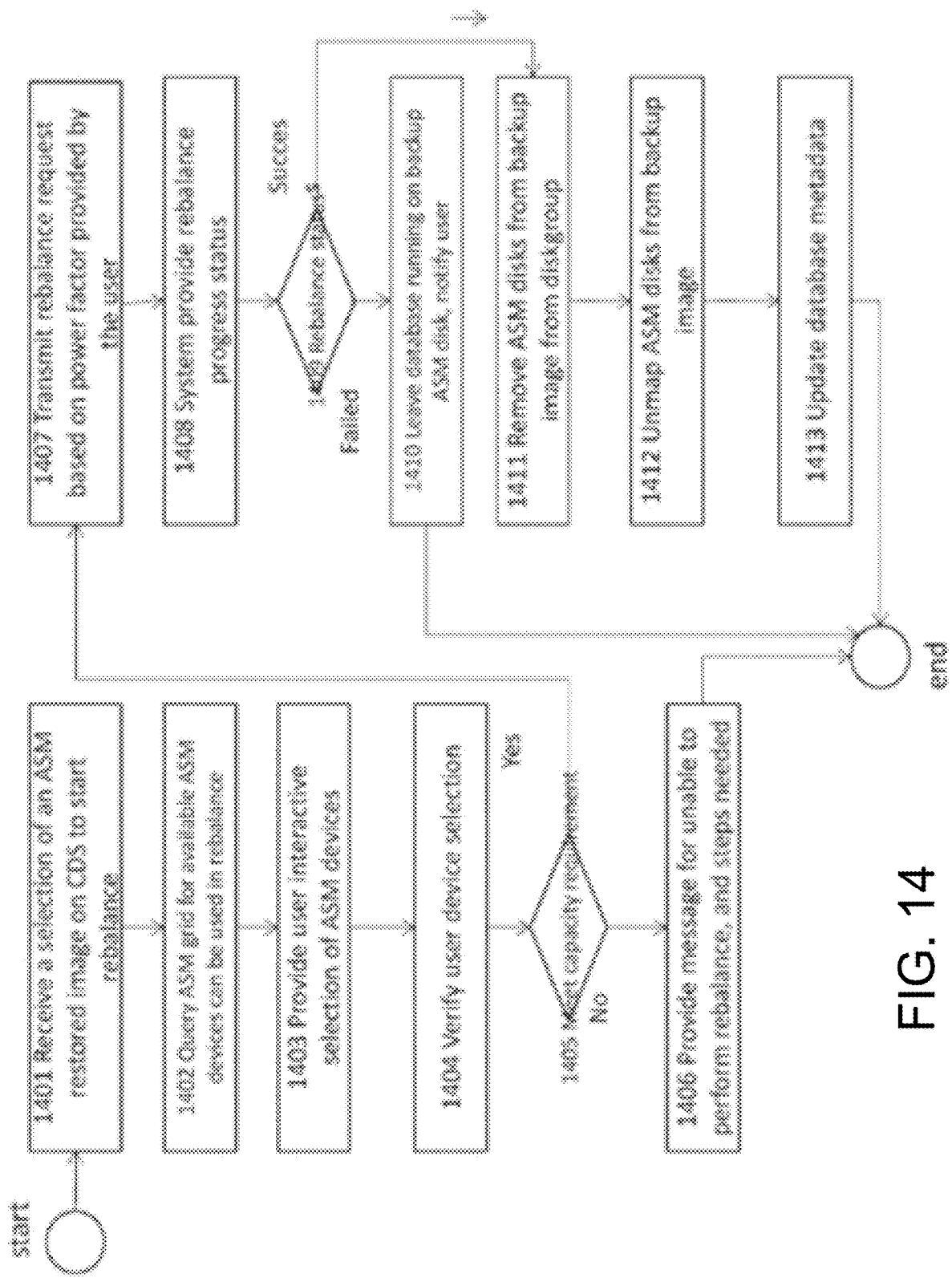
FIG. 14 is a flowchart showing a rebalance of ASM disk group on a switched database, according to some embodiments of the present disclosure.

FIG. 14 is a flowchart showing a rebalance of ASM disk group on a switched database, according to some embodiments of the present disclosure.

When ASM diskgroup data is switched from original production storage devices to backup storage devices, storage array performance characteristics can be different between production and backup storage arrays. That is, the data IO and throughput can be different and can have impact on the database performance. As referred to herein, rebalance refers to a process of migrating data from backup storage devices back to production storage devices while database is online. At the end of this rebalance operation, backup storage devices, e.g. disks in the flashcopy created from backup image, can be removed from the diskgroup. The data can be evenly placed across the newly added production storage devices.

Referring to step 1401, CDS 1011 receives a user selection of an Oracle instance that is running from backup image after successful switch. A successfully switch restored Oracle instance displays an ASM Switch lock on GUI on this Oracle instance. An action dropdown list provides a set of tasks can be performed on this instance; rebalance is one of these tasks. User can select rebalance and send request to CDS 1011 to initialize a rebalance operation.

Referring to step 1402, CDS 1011 queries available ASM devices that can be used in rebalance. In some embodiments, CDS 1011 queries available ASM devices by sending a command message to each connector (e.g., 2001) on primary RAC node (e.g., 1001). Connector software queries ASM instance for any disks that has header status as CANDIDATE, FORMER, or PROVISIONED. Connector software 2001 sends a list of disks satisfies these conditions back to CDS 1001 with size of the each disk.

Referring to step 1403, CDS provides the disk list to user through either GUI or CLI output. User selects a set of devices to be used in rebalance operation from this list.

Referring to step 1404, CDS 1011 verifies the user's device selection. In some embodiments, this verification process includes performing a check to determine if the capacity of the devices being selected satisfies the switched database capacity requirement. The original database size is kept in the backup image metadata. In some embodiments, when a user selects one or more disks for rebalance, the sum of the capacity is equal or greater than the size of the database in order to move all data from switched disks to these new set of disks.

Referring to step 1405, CDS 1011 determines if the capacity requirement is met as described above in step 1404. If the capacity requirement is not met, CDS 1011 provides a message in step 1406 that the devices selected for rebalance fail to meet the capacity to migrate all data from switched devices to new production devices.

Referring to step 1407, CDS 1011 transmits a rebalance request based on a power factor specified by user. In some embodiments, a rebalance operation can be long lasting. For example, for a 50 TB database, there can be new disks added to the diskgroup to start the rebalance. Moving 50 TB of data from existing disks to those 25 disks can last for a few days depends on the power factor used. Power factor is an ASM rebalance parameter controls the speed of data movement during rebalance; it has impact on the database performance if set too high, e.g. move data from existing disks to new disks at faster pace. Power factor varies depends on the ASM software version, it ranges from 1-11 to 1-1024. This range is determined based on the ASM software version and provided through GUI.

Referring to step 1408, CDS 1011 provides a progress of the rebalance operation through a system job status monitor as percentage of a job completion. Connector software 2001 monitors the rebalance operation and sends status back to CDS 1011.

Referring to step 1409, connector software 2001 checks the status of the rebalance at the completion of the rebalance by checking gv$asm_operation view for rebalance operation. gv$asm_operation is a global view from Oracle ASM providing a status of long running operations including rebalance. This status will be sent to CDS 1011 to update the rebalance job metadata.

Referring to step 1410, if the rebalance status indicates a failed rebalance, CDS 1011 leaves the switched database to run on switched devices and notifies a user that the rebalance failed.

Referring to step 1411, if the rebalance is successful CDS 1011 removes devices used in the switch that originated from backup image. Once rebalance operation has successfully completed, all data resides on switched devices from flashcopy of backup image now being moved to production storage devices 1007, and switched devices at the completion of the rebalance being dropped from the datagroup and free to be unmapped from the host by CDS 1011. At this point the database is running again on production storage devices, and has no dependency on any devices from the backup image that are provided by CDS as part of switch operation.

Referring to step 1412, connector software 2001 keeps the diskgroup used in switch mounted, drops switched devices from this diskgroup, and CDS 1011 unmaps the switched devices from RAC nodes 1001, 1002, and 1003.

Referring to step 1413, CDS 1011 updates metadata in management database, which is a data repository on CDS to store all operational metadata including historical ones, to conclude the restore operation by using switch and rebalance. At the conclusion of the restore operation, the Oracle instance has successfully underwent rebalance operation after switch. In some embodiments, a migratable flag is reset to prevent any attempt running a rebalance on this database at its current state.

Figure 15:
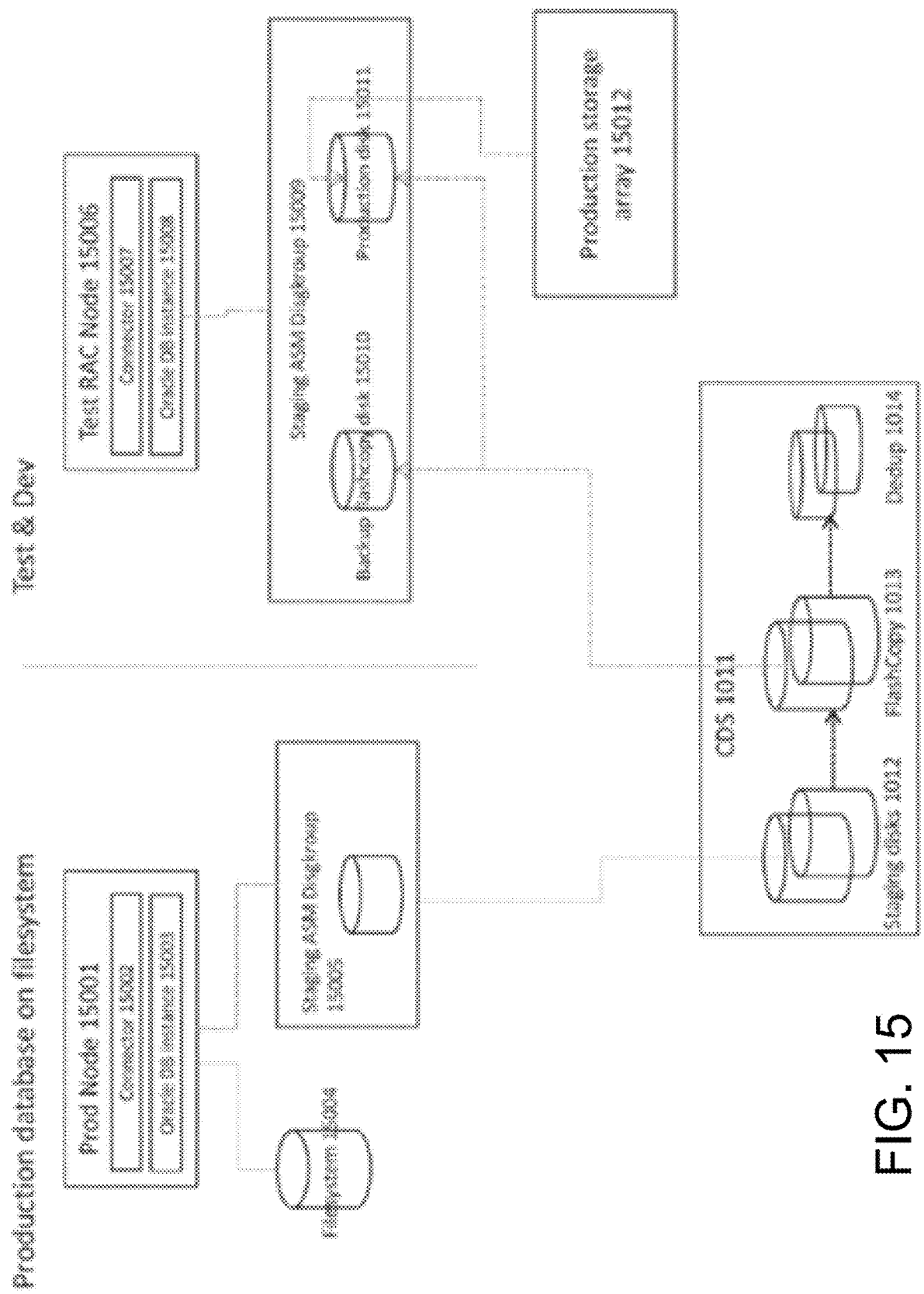
FIG. 15 system diagram showing a production database running on filesystem, being backed up onto an ASM diskgroup with staging storage provided by CDS, according to some embodiments of the present disclosure.

FIG. 15 is system diagram showing a production database 15003 running on filesystem 15004, being backed up onto an ASM diskgroup 15005 with staging storage provided by CDS, according to some embodiments of the present disclosure. Once production data is virtualized, test&dev copy of database 15008 can be created and running from ASM diskroup 15009 with disk 15010 coming from the flashcopy 1013 of backup image. In some embodiments, data on disk 15010 can be migrated to production disk 15011 if user wants to have the test&dev database running on a different storage tier. Production disk 15011 can be associated with production storage array 15012.

Figure 16:
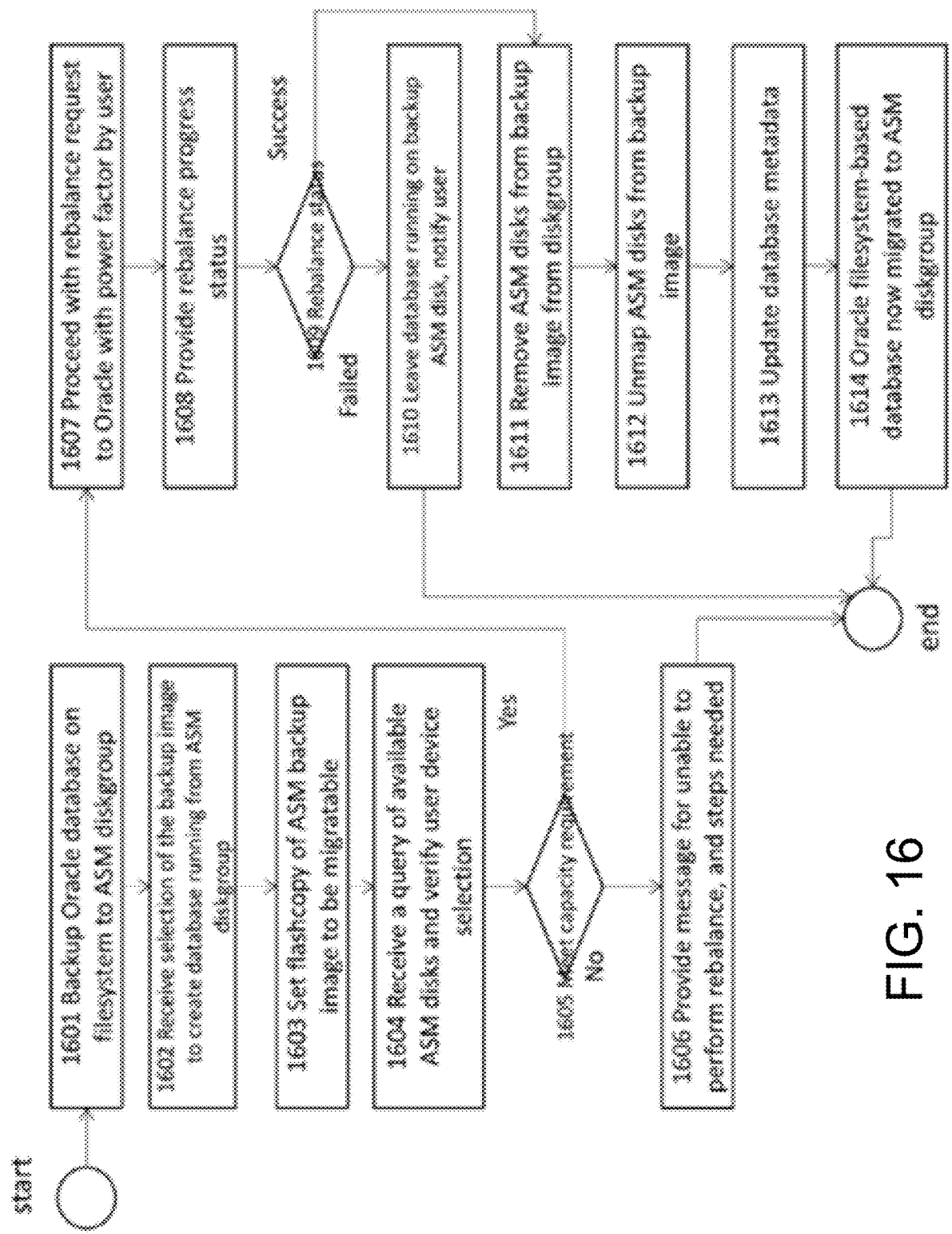
FIG. 16 is a flowchart showing a migration of a database on a filesystem to an ASM disk group, according to some embodiments of the present disclosure.

FIG. 16 is a flowchart showing a migration of a database on a filesystem to an ASM disk group, according to some embodiments of the present disclosure.

In some embodiments, the steps illustrated in FIG. 16 can move a test&dev database instance from backup storage to a different tier of storage that can satisfy different performance requirement, such as user acceptance testing (UAT). There is no production storage repair involved here. Generally, a test&dev instance is created using virtualized backup storage from CDS 1011, and provided to end user for one's test&dev needs. In most environments, backup storage used by CDS and production storage are at different tier, e.g. they have different performance characteristics and costs are different. When test&dev runs on the same class of the production storage, the systems and methods described herein can be deployed and move the data on virtualized backup storage to a production class storage. The difference between the schemes in FIG. 16 and FIG. 14 is that for FIG. 16's test&dev instance, there is no switch operation prior to rebalance. Switch is not a prerequisite for rebalance, rebalance can be done on an instance that is running from ASM diskgroup.

Referring to step 1601, CDS 1011 backs up Oracle database on filesystem 15004 to ASM diskgroup 15005 as described in FIG. 15.

Referring to step 1602, CDS 1011 receives a selection of a backup image and creates a database running from ASM diskgroup using ASM backup image from source database.

Referring to step 1603, CDS 1011 sets a flashcopy of ASM backup image to be migratable. In some embodiments, CDS 1011 labels the newly created image for new database as migrateable (i.e. a candidate for rebalance). In some embodiments, migrateable flag satisfies the following criteria where the backup image is on ASM, and its used in creating a database that is running.

Referring to step 1604, CDS 1011 sends requests to connector software 15007 on database host 15006, and receives available ASM disks from connector software 15006. ASM deems a disk is available when it is not used by any existing diskgroup, its header marked as candidate, provisioned, or former. CDS 1011 verifies a user device selection and meets the capacity requirement to migrate (rebalance) data from disks from CDS 1011 to these new disks (from storage array 15012).

Referring to step 1605, CDS 1011 determines a result of a capacity requirement based on a check of selected devices. CDS 1011 uses allocated database size of test&dev database to match the aggregated capacity of selected devices. In some embodiments, CDS 1011 only moves ahead with rebalance operation if capacity check passes.

Referring to step 1606, if at step 1605, CDS 1011 determines that the capacity is not sufficient, CDS 1011 sends a message to the user indicating the reason for insufficient capacity. Insufficient capacity can result in CDS 1011 at the end of rebalance not being able to remove backup flashcopy disks from the diskgroup. The test&dev database 15008 can run on both backup flashcopy disks and production disks if this happens. User can add more disks from storage array 15012 to ASM and repeat step 1604.

Referring to step 1607, if at step 1605, CDS 1011 determines that the capacity is sufficient, CDS 1011 starts rebalance operation with a provided power factor. Power factor can be provided either through either GUI or CLI input.

Referring to step 1608, CDS 1011 provides a rebalance progress update. In some embodiments, a rebalance progress update is provided because a rebalance can be long lasting and can depend on the size the database and power factor used. A system job status can be used to monitor the rebalance as percentage of a job completion. Connector software 15007 monitors the rebalance operation and sends status back to CDS 1011. System monitor of CDS provides this job status to user.

Referring to step 1609, upon completion of the rebalance, connector software 15007 checks the status of the rebalance at the completion of the rebalance by checking gv$asm operation view for rebalance operation. Connector software 15007 sends the result to CDS 1011 to update job status.

Referring to step 1610, if the rebalance status indicates a failed rebalance, CDS 1011 leaves the switched database to run on switched devices and notifies a user that the rebalance failed.

Referring to step 1611, if the rebalance is successful CDS 1011 removes devices used in the switch that originated from backup image. Once rebalance operation has successfully completed, data that resides on switched devices 15010 from flashcopy of backup image are moved to production storage devices 15011, and switched devices at the completion of the rebalance are dropped from the ASM datagroup 15009 and free to be unmapped from the host 15006 by CDS 1011.

Referring to step 1612, CDS 1011 unmaps the switched devices from the RAC nodes.

Referring to step 1613, CDS 1011 updates metadata in management database, which is a data repository on CDS to store all operational metadata including historical ones. The test&dev database metadata is now updated with a migrateable flag set to false as it already gone through rebalance successfully. It is now running independent of CDS 1011 provided storage.

Referring to step 1614, the database is now running from ASM diskgroup using production storage devices.

FIG. 17 is a screenshot showing an ASM switch interface, according to some embodiments of the present disclosure.

This GUI interface provides user choices for restore type, and by select 17001 leads to restore Oracle database using ASM Switch. In some embodiments, text field 17002 appears as required field asking user's input for Diskgroup name used for Switch operation.

FIG. 18 is a screenshot showing a preflight check for ASM switch, according to some embodiments of the present disclosure.

Preflight check can be used to ensure that a restore of an Oracle database using switch goes smoothly. Once a user provides a name for diskgroup to be used in switch and clicks on Button 18001, a preflight check command is sent to CDS 1011 and Connector 2001. Connector 2001 can use a preflight check list to go over each item. For example, diskgroup datadg can fail a check because the diskgroup datadg already exists. Preflight check status is sent back to CDS 1011 with a specific message of reason for failing the check, e.g. datadg already exists. In response to the preflight check failure, the GUI does not allow the submit button 18002 to be selected by the user to start an ASM Switch. Instead the GUI allows the user to provide another diskgroup name and rerun a preflight check. Once the preflight check passes, submit button 18002 is enabled to allow user to start the switch operation.

FIG. 19 is a screenshot showing a restored database after ASM switch, according to some embodiments of the present disclosure.

After a successful restore of the database, a GUI interface can display which backup image is used for switch in icon 19001, with a numeric number on the icon indicating its use for restore (switch) operation. On the status bar of this database, the backup image can be labeled (e.g., as ASM SWITCHED (LOCKED) in 19002). Next to the label, there is a button 19003 for initializing rebalance operation, or a hyperlink 19004 to undo the switch operation, which can bring down the running database from switch and cleanup diskgroup used for switch and devices mapped from CDS 1011.

FIG. 20 is a screenshot showing an ASM rebalance, according to some embodiments of the present disclosure.

Once a user initializes a rebalance by clicking button 19003, the GUI can display a page of available devices in 20002. As shown in FIG. 20, no devices are selected by a user yet (e.g., no boxes are checked). Before a user selects a device, the ASM Rebalance button 20004 and slider 20003 for powerfactor selection are disabled. Button 20001 allows a user to refresh the device list 20002 (e.g., if the user does not find a satisfactory result) and additional devices are provided, if available. In some embodiments, the additional devices are provided from a storage/system admin.

FIG. 21 is a screenshot showing a rebalance device selection and capacity validation, according to some embodiments of the present disclosure.

Once a user selects one or more devices in 21001, a check is made to see if a sum of the capacity of the selected device(s) is equal or greater than the database size. If this requirement is met, information display 21002 can display with a green color with message that the capacity requirement has been satisfied. At this time, a user can select a desired powerfactor using slider 20003. ASM Rebalance button 20004 is also enabled to allow a user to start a rebalance operation.

In some examples described herein, the techniques are described with respect to Oracle databases and systems. These examples are intended to be exemplary only and not limiting. The techniques described herein can be implemented with other types of storage methods and systems, as can be appreciated by one of skill in the art. For example, the systems and methods described herein can also apply to other databases and systems with similar functionality as ASM. ASM (Automatic Storage Management) is a management tool designed by Oracle specifically for Oracle database storage management. ASM provides a consistent storage management interface across all server and storage platforms. ASM also provides a clustered filesystem for RAC databases and a consistent clusterwide namespace for database files. ASM simplifies administration of Oracle related files by managing a group of disks rather than individual disks and files. The main components of ASM are disk groups, each of which comprise of several physical disks that are controlled as a single unit. The physical disks are known as ASM disks; while the files that reside on the disks are know as ASM files. The locations and names for the files are controlled by ASM, but user-friendly aliases and directory structures can be defined for ease of reference.

In some examples described herein, the techniques are described with respect to systems provided by Actifio. These examples are intended to be exemplary only and not limiting. The systems and methods described herein can utilize any other type of system, as can be understood by a person of skill in the art. For example, Actifio CDS, as used herein, can be protecting a production database with this technique, and provide instant restore capability for the protected database. Actifio CDS, when using this technique, can also provides instant provisioning capability for test & dev equivalent of production database setup. Actifio CDS keeps point-in-time flashcopy backup images which can be used to restore or provision test & dev instances. The metadata of flashcopy backup image is maintained in a management database that is updated after each backup. Actifio CDS manages life cycle of backup of databases and test & dev copies originated from the backups.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computer-implemented method when executed on data processing hardware causes the data processing hardware to perform operations comprising:
   receiving a request to restore a backup image of a failed shared storage device associated with a clustered database comprising a plurality of nodes, each node of the plurality of nodes comprising database data from the failed shared storage device;
   validating that a user associated with the request is authorized to restore the backup image of the failed shared storage device; and
   based on validating that the user associated with the request is authorized to restore the backup image of the failed shared storage device, restoring the database data from the failed shared storage device by:
  creating at least one flashcopy associated with the backup image;
  mapping each node of the plurality of nodes to an associated portion of the at least one flashcopy such that the at least one flashcopy is accessible as a diskgroup by each of the plurality of nodes, the diskgroup comprising a plurality of disks;
  obtaining a power factor associated with a speed of data movement during data distribution; and
  distributing diskgroup data equally among the plurality of disks of the diskgroup based on the power factor.

2. The computer-implemented method of claim 1, wherein the operations further comprise:
  mounting, by each respective node of the plurality of nodes, the at least one flashcopy to the respective node as the diskgroup; and
  switching, by the plurality of nodes, the clustered database to run from the diskgroup.

3. The computer-implemented method of claim 1, wherein the operations further comprise:
  performing a preflight check on the plurality of nodes of the clustered database; and
  determining that the preflight check on the plurality of nodes passed.

4. The computer-implemented method of claim 3, wherein performing the preflight check on the plurality of nodes comprises at least one of:
  checking a location of software associated with performing the request;
  determining that requisite software is running; or
  determining that the clustered database is running.

5. The computer-implemented method of claim 3, wherein the operations further comprise:
  determining that the failed shared storage has been repaired; and
  after determining that the failed shared storage has been repaired, migrating the diskgroup data from the diskgroup back to the failed shared storage.

6. The computer-implemented method of claim 1, wherein validating that the user associated with the request is authorized to restore the clustered database comprises at least one of:
  determining an identity of the user,
  determining execution rights associated with the user, or
  determining a permission status associated with the user.

7. The computer-implemented method of claim 1, wherein the operations further comprise:
  querying at least one of the plurality of nodes to determine an availability status of at least one disk of the clustered database; and
  receiving the availability status of the at least one disk of the clustered database.

8. The computer-implemented method of claim 1, wherein each node of the plurality of nodes form a real application cluster (RAC).

9. The computer-implemented method of claim 1, wherein the flashcopy comprises a point-in-time snapshot copy of the backup image.

10. The computer-implemented method of claim 1, wherein the backup image comprises an incremental backup of the failed shared storage device.

11. A system comprising:
  data processing hardware; and
  memory hardware in communication with the data processing hardware, the memory hardware storing instructions that when executed on the data processing hardware cause the data processing hardware to perform operations comprising:
    receiving a request to restore a backup image of a failed shared storage device associated with a clustered database comprising a plurality of nodes, each node of the plurality of nodes comprising database data from the failed shared storage device;
    validating that a user associated with the request is authorized to restore the backup image of the failed shared storage device; and
    based on validating that the user associated with the request is authorized to restore the backup image of the failed shared storage device, restoring the database data from the failed shared storage device by:
      creating at least one flashcopy associated with the backup image;
      mapping each node of the plurality of nodes to an associated portion of the at least one flashcopy such that the at least one flashcopy is accessible as a diskgroup by each of the plurality of nodes, the diskgroup comprising a plurality of disks;
      obtaining a power factor associated with a speed of data movement during data distribution; and
      distributing diskgroup data equally among the plurality of disks of the diskgroup based on the power factor.

12. The system of claim 11, wherein the operations further comprise:
  mounting, by each respective node of the plurality of nodes, the at least one flashcopy to the respective node as the diskgroup; and
  switching, by the plurality of nodes, the clustered database to run from the diskgroup.

13. The system of claim 11, wherein the operations further comprise:
  performing a preflight check on the plurality of nodes of the clustered database; and
  determining that the preflight check on the plurality of nodes passed.

14. The system of claim 13, wherein performing the preflight check on the plurality of nodes comprises at least one of:
  checking a location of software associated with performing the request;
  determining that requisite software is running; or
  determining that the clustered database is running.

15. The system of claim 13, wherein the operations further comprise:
  determining that the failed shared storage has been repaired; and
  after determining that the failed shared storage has been repaired, migrating the diskgroup data from the diskgroup back to the failed shared storage.

16. The system of claim 11, wherein validating that the user associated with the request is authorized to restore the clustered database comprises at least one of:
  determining an identity of the user,
  determining execution rights associated with the user, or
  determining a permission status associated with the user.

17. The system of claim 11, wherein the operations further comprise:
  querying at least one of the plurality of nodes to determine an availability status of at least one disk of the clustered database; and
  receiving the availability status of the at least one disk of the clustered database.

18. The system of claim 11, wherein each node of the plurality of nodes form a real application cluster (RAC).

19. The system of claim 11, wherein the flashcopy comprises a point-in-time snapshot copy of the backup image.

20. The system of claim 11, wherein the backup image comprises an incremental backup of the failed shared storage device.

* * * * *